(12) United States Patent
Bickerstaff

(10) Patent No.: US 10,179,662 B2
(45) Date of Patent: Jan. 15, 2019

(54) AIRCRAFT AIRFRAME ASSEMBLY

(71) Applicant: BAE Systems plc, London (GB)

(72) Inventor: John Bickerstaff, Balderstone (GB)

(73) Assignee: BAE Systems plc, London (GB)

( * ) Notice: Subject to any disclaimer, the term of this patent is extended or adjusted under 35 U.S.C. 154(b) by 240 days.

(21) Appl. No.: 15/304,674

(22) PCT Filed: Apr. 21, 2015

(86) PCT No.: PCT/GB2015/051179
§ 371 (c)(1),
(2) Date: Oct. 17, 2016

(87) PCT Pub. No.: WO2015/162413
PCT Pub. Date: Oct. 29, 2015

(65) Prior Publication Data
US 2017/0045876 A1 Feb. 16, 2017

(30) Foreign Application Priority Data

Apr. 24, 2014 (EP) ..................... 14275090
Apr. 24, 2014 (GB) ..................... 1407182.3
Jan. 21, 2015 (GB) ..................... 1500973.1

(51) Int. Cl.
*G06F 19/00* (2018.01)
*B64F 5/10* (2017.01)
(Continued)

(52) U.S. Cl.
CPC .............. *B64F 5/10* (2017.01); *G05B 19/402* (2013.01); *G05B 19/4099* (2013.01);
(Continued)

(58) Field of Classification Search
CPC .......................................... B64F 5/10
(Continued)

(56) References Cited

U.S. PATENT DOCUMENTS 4,196,522 A 4/1980 Bell et al.
4,783,228 A 11/1988 Aker
(Continued)

FOREIGN PATENT DOCUMENTS

DE 19900950 C1 5/2000
EP 1139189 A2 10/2001
(Continued)

OTHER PUBLICATIONS

Scott, Harold A. "Modeling aircraft assembly operations." Simulation Conference Proceedings, 1994. Winter. IEEE, 1994.pp. 920-927 (Year: 1994).*
(Continued)

*Primary Examiner* — Satish Rampuria
(74) *Attorney, Agent, or Firm* — Maine Cernota & Rardin

(57) ABSTRACT

An assembly process for assembling at least part of an aircraft airframe, the assembly process comprising: providing a first assembly including a first part of the airframe and a first reference structure attached thereto; providing a second assembly including a second part of the aircraft airframe and a second reference structure attached thereto; receiving, by a first receptacle, the first reference structure; receiving, by a second receptacle, the second reference structure; moving, by an actuation device, the receptacles into a predetermined configuration, thereby moving the first part of the aircraft airframe and the second part of the aircraft airframe into a predetermined configuration; and performing an assembly operation on the airframe parts to fixedly attach together the first part of the aircraft airframe and the second part of the aircraft airframe, thereby producing the part of the aircraft airframe.

14 Claims, 13 Drawing Sheets

(51) Int. Cl.
*G05B 19/4099* (2006.01)
*G05B 19/402* (2006.01)

(52) U.S. Cl.
CPC .............. *G05B 2219/35025* (2013.01); *G05B 2219/37221* (2013.01); *G05B 2219/49007* (2013.01)

(58) Field of Classification Search
USPC .................................................... 700/95–129
See application file for complete search history.

(56) References Cited

U.S. PATENT DOCUMENTS

| | | | |
|---|---|---|---|
| 4,945,488 A | 7/1990 | Carver et al. | |
| 5,615,483 A * | 4/1997 | Micale | B23P 21/00 29/407.05 |
| 5,806,797 A | 9/1998 | Micale | |
| 5,910,894 A * | 6/1999 | Pryor | G05B 19/41875 219/121.64 |
| 6,519,860 B1 | 2/2003 | Bieg | |
| 6,692,681 B1 | 2/2004 | Lunde | |
| 8,088,317 B1 | 1/2012 | Karem | |
| 8,620,470 B2 * | 12/2013 | Cobb | B64F 5/10 29/407.1 |
| 9,199,417 B1 | 12/2015 | Rotter | |
| 9,651,935 B2 * | 5/2017 | Stone | B23P 19/10 |
| 9,889,949 B2 | 2/2018 | Cookson | |
| 2002/0133252 A1 | 9/2002 | Landers | |
| 2004/0039465 A1 * | 2/2004 | Boyer | G05B 19/401 700/95 |
| 2004/0093731 A1 | 5/2004 | Sarh | |
| 2006/0108058 A1 * | 5/2006 | Chapman | B29C 70/323 156/245 |
| 2006/0225265 A1 | 10/2006 | Burnett et al. | |
| 2007/0222122 A1 | 9/2007 | Ong | |
| 2008/0134505 A1 | 6/2008 | Gabriel et al. | |
| 2008/0246175 A1 | 10/2008 | Biornstad | |
| 2009/0145545 A1 | 6/2009 | Brennan | |
| 2010/0068450 A1 | 3/2010 | Lloyd | |
| 2010/0170996 A1 | 7/2010 | Sankaran | |
| 2010/0269979 A1 | 10/2010 | Abitz | |
| 2011/0156304 A1 | 6/2011 | Walker et al. | |
| 2012/0168561 A1 | 7/2012 | Salmon | |
| 2012/0219764 A1 * | 8/2012 | Biornstad | B29C 53/587 428/175 |
| 2012/0239181 A1 | 9/2012 | Gu et al. | |
| 2013/0117983 A1 | 5/2013 | Sana et al. | |
| 2013/0130016 A1 | 5/2013 | Hodgson et al. | |
| 2013/0019446 A1 | 6/2013 | Venskus | |
| 2014/0059856 A1 | 3/2014 | Simmons | |
| 2015/0203185 A1 | 7/2015 | Rosman | |
| 2015/0225063 A1 | 8/2015 | Littell | |

FOREIGN PATENT DOCUMENTS

| | | | |
|---|---|---|---|
| EP | 1230124 B1 | 12/2005 | |
| EP | 1952972 A1 | 6/2008 | |
| EP | 2772427 A1 | 3/2014 | |
| EP | 2703919 A2 | 5/2014 | |
| FR | 2788743 A1 | 7/2000 | |
| GB | 2350809 A | 12/2000 | |
| GB | 2441226 A | 2/2008 | |
| WO | 199850180 A | 11/1998 | |
| WO | 0136270 A1 | 5/2001 | |
| WO | 20010036270 A1 | 5/2001 | |
| WO | 2014046783 A1 | 3/2014 | |

OTHER PUBLICATIONS

Deo, Ravi B., James H. Starnes, and Richard C. Holzwarth. "Low-cost composite materials and structures for aircraft applications." NATO RTO AVT Panel spring symposium and specialists' meeting Loen, Norway. 2001.pp. 1-12 (Year: 2001).*

Hartley, Keith. "The learning curve and its application to the aircraft industry." The Journal of Industrial Economics (1965): pp. 122-128. (Year: 1965).*

International Search Report and Written Opinion of PCT Application No. PCT/GB2015/053477, dated Mar. 7, 2016, 12 pages.

International Preliminary Report on Patentabiity of International Application No. PCT/GB2015/053477, dated May 23, 2017, 8 pages.

Great Britain Combined Search and Examination Report under Section 17 and 18(3) of Application No. GB1506075.9, dated Sep. 27, 2015, 6 pages.

Great Britain Search Report under Section 17(5) of Application No. GB1407185.6, dated Oct. 29, 2014, 4 pages.

International Search Report and Written Opinion of Application No. PCT/GB2015051091, dated Feb. 19, 2016, 12 pages.

International Search Report of Application No. PCT/GB2015/051090, dated Oct. 12, 2015, 3 pages.

Great Britain Search Report under Section 17(5) of Application No. GB1407184.9, dated Nov. 26, 2014, 3 pages.

Great Britain Search Report under Section 17 of Application No. GB1506074.2, dated Sep. 9, 2015, 3 pages.

Great Britain Search Report under Section 17(5) of Application No. GB1407186.4, dated Aug. 20, 2014, 3 pages.

Great Britain Combined Search and Examination Report under Sections 17 and 18(3) of Application No. GB1506076.7, dated Aug. 21, 2015, 5 pages.

International Search Report and Written Opinion of Application No. PCT/GB2015/051092, dated Apr. 4, 2016, 12 pages.

Great Britain Search Report under Section 17(5) of Application No. GB1407181.5, dated Oct. 29, 2014, 5 pages.

Great Britain Combined Search and Examination Report under Sections 17 and 18(3) of Application GB1506078.3, dated Sep. 29, 2015, 5 pages.

International Preliminary Report on Patentability of Application No. PCTGB2015051095, dated Jan. 8, 2016, 7 pages.

International Search Report and Written Opinion of Application No. PCTGB2015051095, dated Oct. 5, 2015, 9 pages.

Great Britain Search Report under Section 17(5) of Application No. GB1407183.1, dated Oct. 15, 2014, 3 pages.

International Search Report and Written Opinion of Application No. PCTGB2015051110, dated Sep. 29, 2016, 10 pages.

Great Britain Combined Search and Examination Report under Section 17 and 18(3) of Application No. GB1506205.2, dated Sep. 30, 2015, 6 pages.

International Preliminary Report on Patentability of Application No. PCTGB2015051110, dated Sep. 13, 2016, 7 pages.

Great Britain Search Report under Section 17(5) of Application No. GB1420539.7, dated Apr. 29, 2015, 3 pages.

Great Britain Search Report under Section 17(5) of Application No. GB1500973.1, dated Mar. 2, 2015, 3 pages.

International Search Report and Written Opinion of Application No. GB/2015/051179, dated Apr. 15, 2016, 12 pages.

International Search Report and Written Opinion of Application No. PCT/GB2015/051111, dated Feb. 23, 2016, 11 pages.

Great Britain Combined Search and Examination Report under Sections 17 and 18(3) of Application No. GB1506207.8, dated Oct. 1, 2015, 5 pages.

Great Britain Search Report under Section 17(5) of Application No. GB1500946.7, dated Mar. 3, 215, 5 pages.

International Search Report and Written Opinion of Application No. GB/2015/051090, dated Oct. 25, 2016, 8 pages.

International Search Report and Written Opinion of Application No. GB/2015/051091, dated Oct. 25, 2016, 9 pages.

International Search Report and Written Opinion of Application No. GB/2015/051092, dated Oct. 25, 2016, 9 pages.

International Search Report and Written Opinion of Application No. GB/2015/051111, dated Oct. 25, 2016, 8 pages.

International Search Report and Written Opinion of Application No. GB/2015/051179, dated Oct. 25, 2016, 9 pages.

Great Britain Search Report under Sections 17 of Application No. GB1407186.4, dated Aug. 20, 2014, 3 pages.

(56) References Cited

OTHER PUBLICATIONS

Great Britain Combined Search and Examination Report under Sections 17 and 18(3) of Application No. GB1506734.1, dated Oct. 21, 2015, 5 pages.

* cited by examiner

AIRCRAFT AIRFRAME ASSEMBLY

RELATED APPLICATIONS

This application is a national phase application filed under 35 USC § 371 of PCT Application No. PCT/GB2015/051179 with an International filing date of Apr. 21, 2015 which claims priority of GB Patent Application 1407182.3 filed Apr. 24, 2014, EP Patent Application 14275090.0 filed Apr. 24, 2014, and GB Patent Application 1500973.1 filed Jan. 1, 2015. Each of these applications is herein incorporated by reference in their entirety for all purposes.

FIELD OF THE INVENTION

The present invention relates to the assembly of aircraft airframes or parts thereof.

BACKGROUND

Aircraft airframes typically comprise a plurality of frames (or formers) and longerons (or stringers/stiffeners). The frames are typically laterally spaced from one another and arranged perpendicular to the longitudinal axis of the aircraft. The primary purpose of formers is to establish the shape of the fuselage and reduce the column length of the longerons. The longerons are typically elongate members which are attached to the frames and are arranged parallel to the longitudinal axis of the aircraft. The longerons support the aircraft skin and, in use, transfer aerodynamic loads acting on the skin onto the frames.

It is desirable that aircraft airframes are produced to be within very tight tolerance bounds.

Production of an aircraft airframe typically comprises producing two or more separate airframe sections (for example, a fore fuselage section, an aft fuselage section, and a tail section), and subsequently attaching those sections together.

It tends to be very difficult to produce separate airframe sections with a sufficient level of precision to allow for easy assembly of the airframe. Lengthy and expensive shimming processes may be required to fill gaps between the airframe sections when those sections are attached together.

Production of a section of an aircraft airframe typically involves the use of airframe assembly tools designed to support airframe components while they are being worked on and to locate different components together in the correct relative positions during airframe assembly. Traditionally, each different assembly process has required at least one dedicated assembly tool, which is produced specifically for a given set of components and which is designed to support the components in a particular manner so that assembly operations can be carried out without interference from the tool. Such assembly tools are manufactured to exacting standards.

A conventional assembly tool comprises a rigid metal jig whose framework is constructed from welded box section steel. A plurality of pick-up devices is mounted on the framework for carrying the aircraft components during the assembly process, and these too are conventionally produced from welded steel parts.

EP 1 230 124 discloses such an assembly tool.

SUMMARY OF THE INVENTION

In a first aspect, the present invention provides an assembly process for assembling at least part of an aircraft airframe. The assembly process comprises: providing a first assembly, the first assembly including a first part of the aircraft airframe and a first reference structure attached to the first part of the aircraft airframe, the first part of the aircraft airframe having a predetermined position and orientation with respect to the first reference structure; providing a second assembly, the second assembly including a second part of the aircraft airframe and a second reference structure attached to the second part of the aircraft airframe, the second part of the aircraft airframe having a predetermined position and orientation with respect to the second reference structure; receiving, by a first receptacle, at least part of the first reference structure; receiving, by a second receptacle, at least part of the second reference structure; moving, by an actuation device operatively coupled to the first and second receptacles, the first and second receptacles into a predetermined configuration for the receptacles, thereby moving the first part of the aircraft airframe and the second part of the aircraft airframe into a predetermined configuration for the airframe parts; and, while the first part of the aircraft airframe and the second part of the aircraft airframe are in the predetermined configuration for the airframe parts, performing an assembly operation on the airframe parts to fixedly attach together the first part of the aircraft airframe and the second part of the aircraft airframe, thereby producing the at least part of an aircraft airframe.

The at least part of the aircraft airframe may be at least part of an aircraft aft fuselage. The first part of the aircraft airframe may be a first side portion of the aircraft aft fuselage, for example a port boom of the aircraft aft fuselage. The second part of the aircraft airframe may be a second side portion of the aircraft aft fuselage, for example a starboard boom of the aircraft aft fuselage.

The first reference structure may comprise a plurality of protrusions. The first receptacle may comprise a plurality of apertures. Each aperture may be configured to receive a respective protrusion of the first reference structure.

Each protrusion may comprise a fastener head at a distal end of that protrusion and a shank portion connecting the fastener head of that protrusion to the reference frame, the fastener heads having a first diameter, the shank portions having a second diameter, the second diameter being less than the third diameter. Each aperture may be a key-shaped aperture comprising a first portion having a having a diameter greater than or equal to the first diameter, and a second portion having a diameter greater than or equal to the second diameter and less than the first diameter.

The at least part of an aircraft airframe may be for attachment to a further part of the aircraft airframe. Providing the first assembly may comprise: providing a plurality of components of the first part of the aircraft airframe; for each component of the first part of the aircraft airframe, determining a position and orientation of that component relative to the further part of the aircraft airframe that that component would have if the at least part of the aircraft airframe was attached to the further part of the aircraft airframe; providing the first reference structure, the first reference structure being representative of the further part of the aircraft airframe; arranging the components of the first part of an aircraft airframe such that the position and orientation of each of said components relative to the first reference structure is the same as the determined position and orientation relative to the further part of the aircraft airframe that that component would have if the at least part of the aircraft airframe was attached to the further part of the aircraft airframe; and, thereafter, attaching together the components of the first part of the aircraft airframe such that the relative positions and orientations of those components are maintained.

The step of attaching together the components of the first part of the aircraft airframe may be performed such that the relative position and orientation of each of the components of the first part of the aircraft airframe and the first reference structure is maintained.

The further part of the aircraft airframe may be at least part of an aircraft fore fuselage.

Each component of the first part of the aircraft airframe may be selected from a group of airframe components consisting of frames, longerons, keels, and beams.

The step of arranging the components of the first part of an aircraft airframe may comprise producing an assembly tool, the assembly tool including the first reference structure, and mounting the components of the first part of an aircraft airframe on the assembly tool.

After the components of the first part of the aircraft airframe have been attached together, the first part of the aircraft airframe and first reference structure attached thereto may be removed from the assembly tool, thereby providing the first assembly.

The step of producing the assembly tool may comprise: for each component of the first part of the aircraft airframe, using the determined position and orientation of that component relative to the further part of the aircraft airframe, determining one or more positions and orientations relative to the further part of the aircraft airframe at which that component is to be supported; providing a jig frame; attaching, to the jig frame, the first reference structure; providing a plurality of pickup devices, each having a receiving element for receiving a component; and securing each pickup device to the jig frame such that a position and orientation relative to the first reference structure of each receiving element is the same as a respective determined position and orientation relative to the further part of the aircraft airframe at which a component is to be supported.

Providing the second assembly may comprise: providing a plurality of components of the second part of the aircraft airframe; for each component of the second part of the aircraft airframe, determining a position and orientation of that component relative to the further part of the aircraft airframe that that component would have if the at least part of the aircraft airframe was attached to the further part of the aircraft airframe; providing the second reference structure, the second reference structure being representative of the further part of the aircraft airframe; arranging the components of the second part of an aircraft airframe such that the position and orientation of each of said components relative to the second reference structure is the same as the determined position and orientation relative to the further part of the aircraft airframe that that component would have if the at least part of the aircraft airframe was attached to the further part of the aircraft airframe; and, thereafter, attaching together the components of the second part of the aircraft airframe such that the relative positions and orientations of those components are maintained.

The step of attaching together the components of the second part of the aircraft airframe may be performed such that the relative position and orientation of each of the components of the second part of the aircraft airframe and the second reference structure is maintained.

In a further aspect, the present invention provides at least part of an aircraft airframe having been produced using a method according to any of the preceding aspects.

The at least part of the aircraft airframe may be at least part of an aircraft aft fuselage.

In a further aspect, the present invention provides apparatus for assembling at least part of an aircraft airframe. The apparatus comprises: a first receptacle configured to receive at least part of a first reference structure of a first assembly, the first assembly including a first part of the aircraft airframe and the first reference structure attached to the first part of the aircraft airframe, the first part of the aircraft airframe having a predetermined position and orientation with respect to the first reference frame; a second receptacle configured to receive at least part of a second reference structure of a second assembly, the second assembly including a second part of the aircraft airframe and the second reference structure attached to the second part of the aircraft airframe, the second part of the aircraft airframe having a predetermined position and orientation with respect to the second reference frame; and an actuation device operatively coupled to the first and second receptacles and configured to move the first and second receptacles into a predetermined configuration for the receptacles, thereby moving the first part of the aircraft airframe and the second part of the aircraft airframe into a predetermined configuration for the airframe parts.

DETAILED DESCRIPTION

It will be appreciated that relative terms such as horizontal and vertical, top and bottom, above and below, front and back, upper and lower, and so on, are used herein merely for ease of reference to the Figures, and these terms are not limiting as such, and any two differing directions or positions and so on may be implemented rather than truly horizontal and vertical, top and bottom, and so on.

Figure 1:
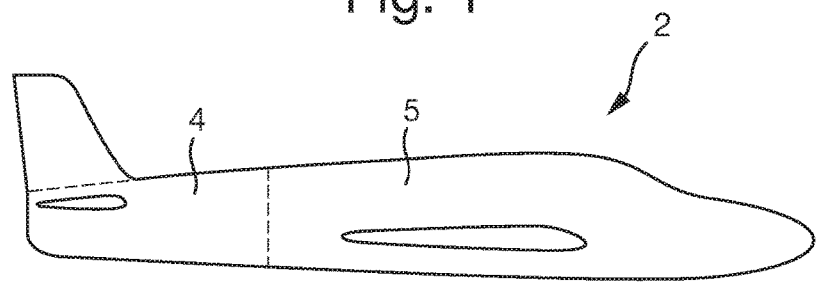
FIG. 1 is a schematic illustration (not to scale) of an example aircraft.

FIG. 1 is a schematic illustration (not to scale) of an example aircraft 2 comprising an aft fuselage 4, and an aircraft fore section 5. The aircraft fore section 5 includes a central fuselage to which the aft fuselage 4 is attached.

The aft fuselage 4 comprises an airframe and an aircraft skin fastened to the airframe. In this embodiment, the aft fuselage 4 comprises a port boom and a starboard boom that are mechanically attached together along a centreline. Each boom of the aft fuselage 4 comprises a plurality of structural components (for example, frames, keels, longerons, and skins) that are mechanically attached together.

Figure 2:
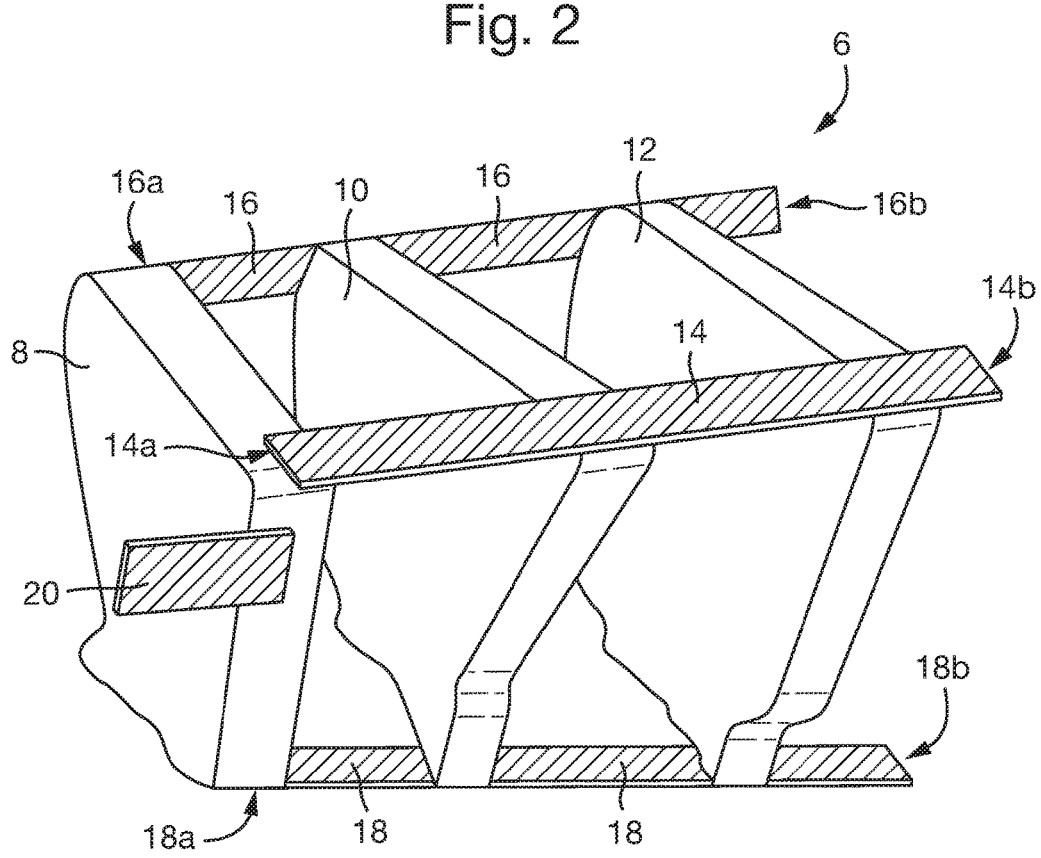
FIG. 2 is a schematic illustration (not to scale) of a portion of an airframe of an aft fuselage of the aircraft.

FIG. 2 is a schematic illustration (not to scale) of a portion of the airframe 6 of the aft fuselage 4. In this embodiment, the portion of the airframe 6 is at least a part of a boom of the aft fuselage 4 (i.e. either a port or starboard boom that is to be attached to an opposite boom).

In this embodiment, the substructure of the aft fuselage 4 comprises two airframes 6 which are attached together, those two airframes 6 being substantially mirror images of each other. A process of attaching together the two airframes 6 so as to form the substructure of the aft fuselage 4 is described in more detail later below with reference to FIG. 15.

In this embodiment, the airframe 6 comprises three laterally spaced-apart frames or "formers", namely a first frame 8, a second frame 10, and a third frame 12; three longerons, namely a first longeron 14, a second longeron 16, and a third longeron 18; and a beam 20. For reasons of clarity, the longerons 14, 16, 18 and the beam 20 are shown as hashed in FIG. 2.

In this embodiment, the frames 8, 10, 12 are made of aluminium or titanium. The frames 8, 10, 12 define the shape of the aircraft fuselage and, in use, provide stability to the aircraft 2 by preventing or opposing deflection of the longerons 14, 16, 18. When the aircraft 2 is fully assembled, the frames 8, 10, 12 are arranged substantially perpendicularly to the longitudinal axis of the aircraft 2

In this embodiment, the longerons 14, 16, 18 are made of aluminium or titanium. The longerons 14, 16, 18 are elongate members to which the skin of the aircraft is fastened. When the aircraft 2 is fully assembled, the longerons 14, 16, 18 run substantially parallel to the longitudinal axis of the aircraft 2. In this embodiment, the longerons 14, 16, 18 are fastened to the frames 8, 10, 12 by a plurality of bolts. In this embodiment, the first longeron 14 has a first end 14a attached to the first frame 8 and a second free end 14b proximate to the third frame 12. Similarly, the second longeron 16 has a first end 16a attached to the first frame 8 and a second free end 16b proximate to the third frame 12. Similarly, the third longeron 18 has a first end 18a attached to the first frame 8 and a second free end 18b proximate to the third frame 12.

In this embodiment, during assembly of the aircraft 2, the second free ends 14b, 16b, 18b of the longerons 14, 16, 18 are attached to the fore fuselage 5 of the aircraft 2. In particular, the second free ends 14b, 16b, 18b of the longerons 14, 16, 18 are attached to a frame of the fore fuselage 5. This frame of the fore fuselage 5 to which the second free ends 14b, 16b, 18b of the longerons 14, 16, 18 are to be attached is hereinafter referred to as the "fore fuselage frame".

In this embodiment, the beam 20 is made of aluminium or titanium. The beam 20 is an elongate member. The beam 20 is attached at its first end (i.e. a proximal end) to the first frame 8 by a plurality of bolts, and extends away from the frames 8, 10, 12 to its second end (i.e. a distal free end) opposite to its first end. When the aircraft 2 is fully assembled, the beam 20 runs substantially parallel to the longitudinal axis of the aircraft 2.

In this embodiment, in addition to being attached together by the longerons 14, 16, 18, the frames 8, 10, 12 are attached together by further structural elements often called "keels" which are located between adjacent frames 8, 10, 12. For ease of illustration and clarity, these keels are not shown in FIG. 2.

In this embodiment, to produce the aft fuselage 4, a composite aircraft skin is fastened to the airframe 6. The outer shape of the assembled aft fuselage 4 (i.e. the outer shape of the aft fuselage 4 produced by fastening the composite skin to the airframe 6) is hereinafter referred to as the Outer Mould Line (OML) of the aft fuselage 4. In this embodiment, the OML of the aft fuselage 4 is to be within a pre-specified tolerance. The OML of the aft fuselage 4 having the required tolerance is facilitated by the Inner Mould Line (IML) of the aft fuselage 4 being within a pre-specified tolerance. The IML of the aft fuselage 4 is the surface at which the airframe 6 and the aircraft skin abut, i.e. an outer surface of the airframe 6 and inner surface of the aircraft skin.

An embodiment of a process of producing the airframe 6 is described in more detail later below with reference to FIG. 7.

Figure 3:
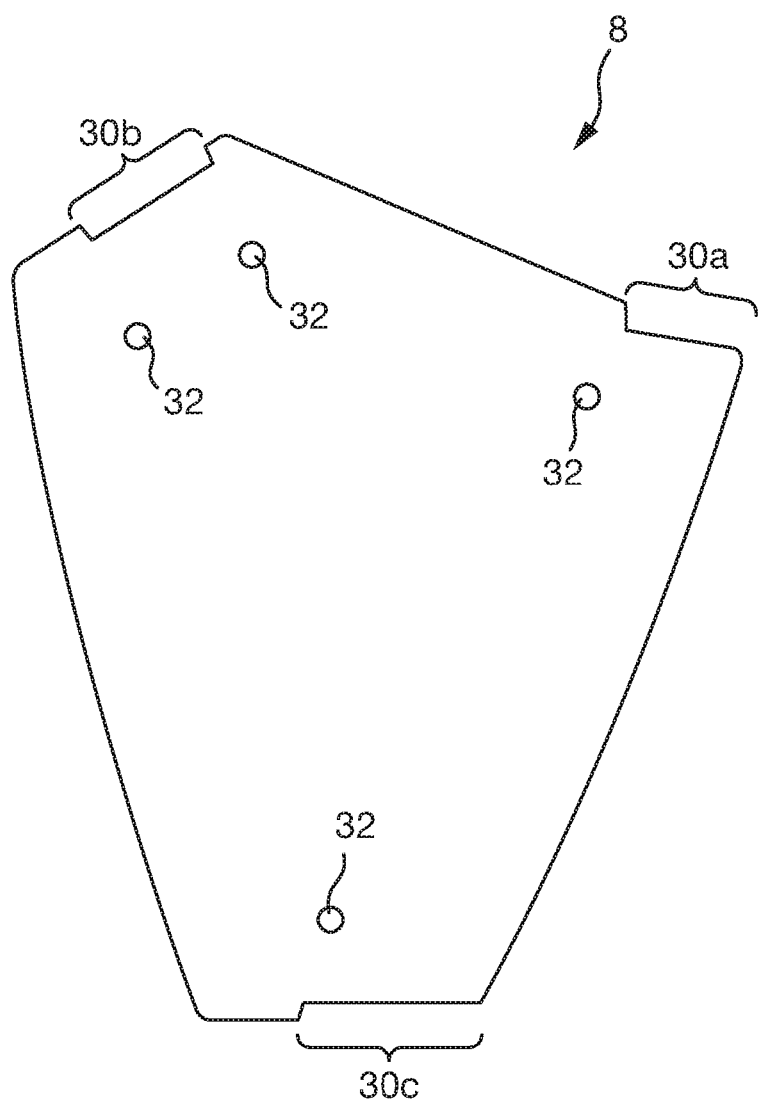
FIG. 3 is a schematic illustration (not to scale) showing a side view of a first frame.

FIG. 3 is a schematic illustration (not to scale) showing a side view of the first frame 8.

The first frame 8 comprises a plurality of longeron landings 30a-c to which, during assembly of the airframe 4, the longerons 14, 16, 18 are fastened. In particular, the first frame 8 comprises a first longeron landing 30a shaped to receive a portion of the first longeron 14, a second longeron landing 30b shaped to receive a portion of the second longeron 16, and a third longeron landing 30c shaped to receive a portion of the third longeron 18. The longeron landings 30a-c are attachment features to which other components, in particular the longerons 14-18, attach.

The first frame 8 further comprises a plurality of fixture attachment features 32. In this embodiment, there are four fixture attachment features 32. As described in more detail later below, the fixture attachment features 32 are for attaching the first frame 8 to a fixture such as a machining fixture and/or an assembly fixture. In this embodiment, the fixture attachment features 32 are holes through the structure of the first frame 8 through which locator pins or other elongate members may be positioned.

In this embodiment, similarly to the first frame 8, the second frame 10 also comprises three longeron landings, each longeron landing being configured to receive a portion of a respective longeron 14, 16, 18. Also, the second frame 10 comprises a plurality of fixture attachment features.

In this embodiment, similarly to the first and second frames 8, 10, the third frame 12 also comprises three longeron landings, each longeron landing being configured to receive a portion of a respective longeron 14, 16, 18. Also, the third frame 12 comprises a plurality of fixture attachment features.

Figure 4:
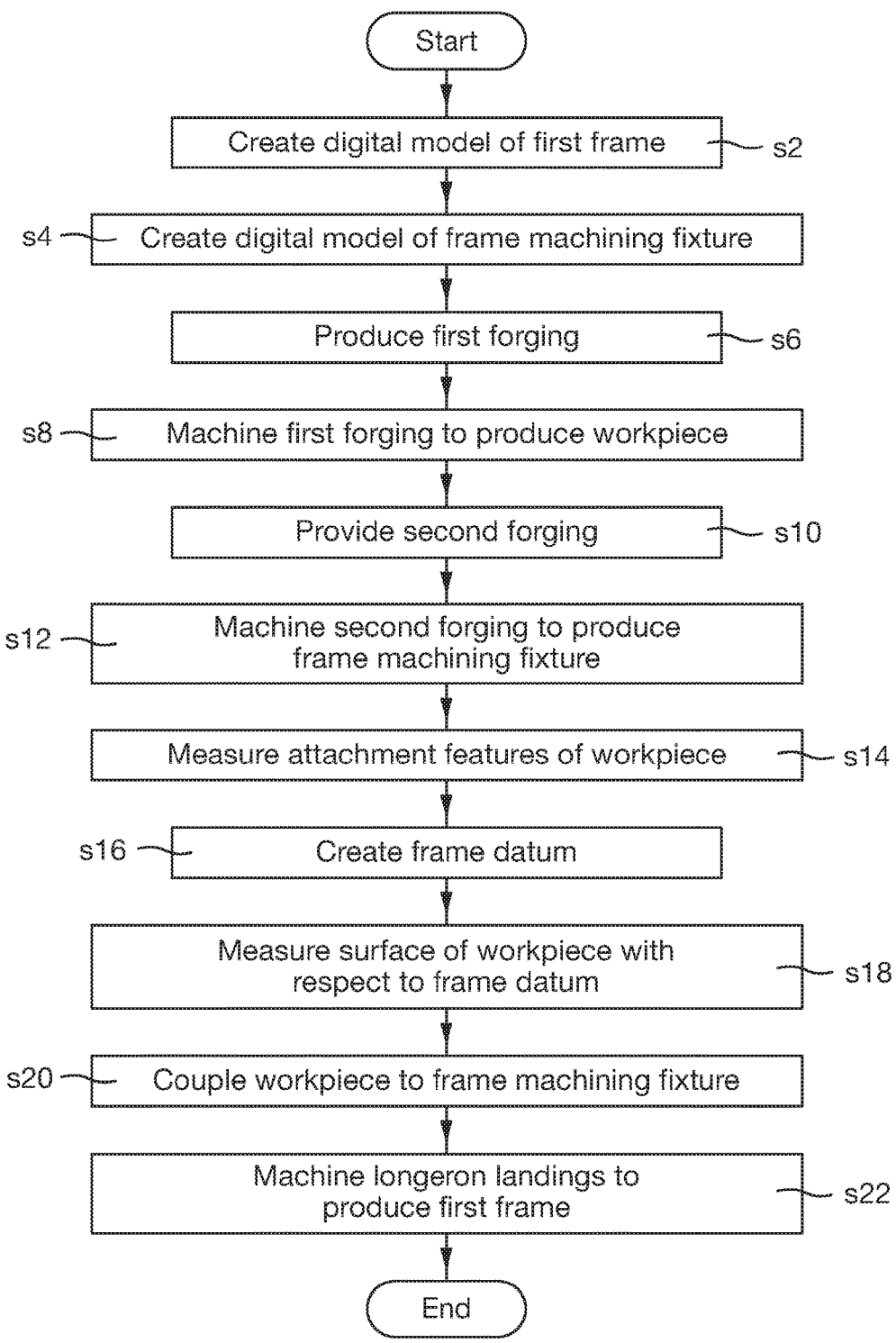
FIG. 4 is a process flow chart showing certain steps of a process of producing the first frame.

FIG. 4 is a process flow chart showing certain steps of a process of producing the first frame 8. A similar process, mutatis mutandis, may be used to produce the second and third frames 10, 12. A similar process, mutatis mutandis, may be used to produce the beam 20. A similar process, mutatis mutandis, may be used to produce the longerons 14, 16, 18.

At step s2, a human designer generates or creates a digital model, hereinafter referred to as the "first digital model". The first digital model is of the first frame 8. This may be performed using a computer and an appropriate software package, for example, the Catia (Trademark) V4 software package. The first digital model may defined using a digital model of the airframe 6 or aft fuselage 4.

At step s4, the human designer generates or creates a further digital model, hereinafter referred to as the "second digital model". The second digital model is of a frame machining fixture. The frame machining fixture is a fixture system that is to be used to secure a workpiece in place whilst that workpiece is machined to form the first frame 8. The frame machining fixture will be described in more detail later below with reference to FIG. 5.

At step s6, a forging system produces a first forging. The first forging is an aluminium blank from which the first frame 8 is to be produced. A digital model of the first forging may be used to produce the first forging. This digital model may be defined using a digital model of the airframe 6 or aft fuselage 4.

At step s8, using the first digital model, a 5-axis computer numerical control (CNC) milling machine machines the first forging to produce a workpiece from which the first frame 8 is to be produced.

In this embodiment, the workpiece is essentially the same shape as the first frame 8 except that the workpiece comprises additional material where the longeron landings 30*a-c* are to be located. The workpiece comprises the fixture attachment features 32. The workpiece will be described in more detail later below with reference to FIG. 5.

At step s10, the forging system produces a second forging. The second forging is a steel blank from which the frame machining fixture is to be produced. In other embodiments, the blank from which the frame machining fixture is to be produced is a structure created by bolting or welding a plurality of substructures together. A digital model of the second forging may be used to produce the second forging. This digital model may be defined using a digital model of the airframe 6 or aft fuselage 4.

At step s12, using the second digital model, the 5-axis CNC milling machine machines the second forging so as to produce the frame machining fixture. In other embodiments, the frame machining fixture is created by bolting or welding a plurality of substructures together. The first digital model may also be used in the production of the frame machining fixture.

Figure 5:
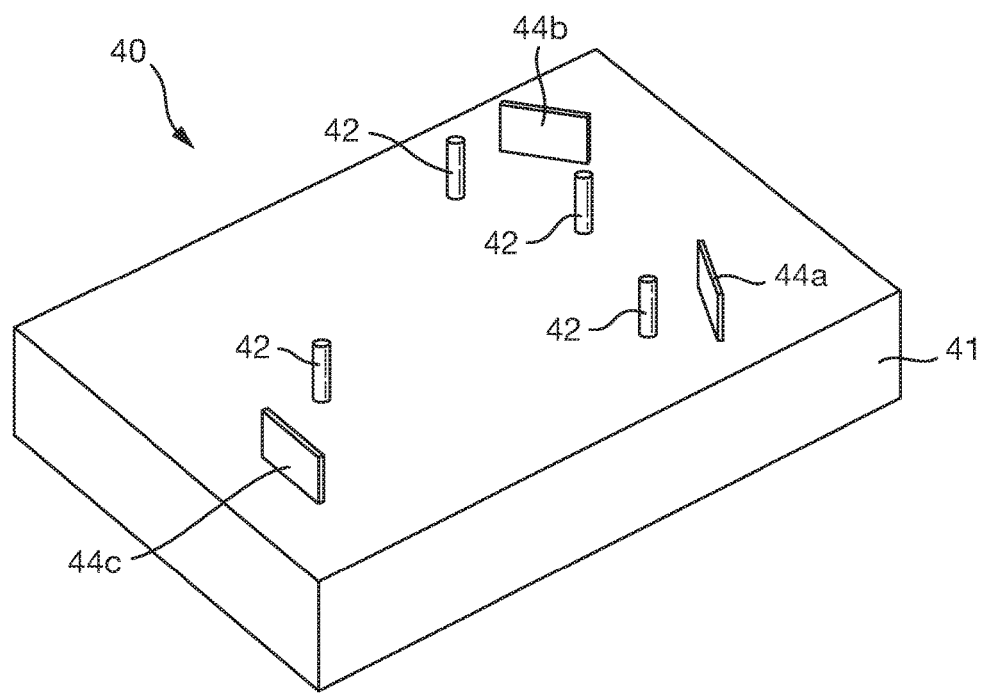
FIG. 5 is a schematic illustration (not to scale) of a perspective view of a frame machining fixture.

FIG. 5 is a schematic illustration (not to scale) of a perspective view of the frame machining fixture 40.

In this embodiment, the frame machining fixture 40 comprises a substantially rigid base portion 41, a plurality of locator pins 42, and a plurality of precision ground blocks 44*a-c*.

In this embodiment, there are four locator pins 42. The locator pins 42 are located on an upper surface of the base portion 41 and extend away from the upper surface of the base portion 41 in a direction that is substantially perpendicular to that surface. In this embodiment, each of the locator pins 42 is configured to couple to a respective fixture attachment feature 32 of the workpiece. The relative positions of the locator pins 42 correspond to those of the fixture attachment features 32 such that the workpiece may be placed onto the upper surface of the base portion 41 in such a way that each locator pin 42 couples to a respective fixture attachment feature 32, thereby securing the workpiece against the frame machining fixture 40. The workpiece and the frame machining fixture 40 are complementary. The locator pins 42 are configured to securely hold the workpiece to prevent or oppose movement or deflection of the workpiece while the workpiece is being machined.

In this embodiment, the first and second digital models are created concurrently. This tends to facilitate in the production of the complementary workpiece and the frame machining fixture 40.

In this embodiment, there are three blocks 44*a-c*, namely a first block 44*a*, a second block 44*b*, and a third block 44*c*. The blocks 44*a-c* are located on an upper surface of the base portion 41 and extend away from the upper surface of the base portion 41 in a direction that is substantially perpendicular to the upper surface of the base portion 41. In this embodiment, the locations of the blocks 44*a-c* are such that, when the workpiece is coupled to the frame machining fixture 40 by locating the locator pins 42 in the fixture attachment features 32, each block 44*a-c* is proximate to a respective surface of the workpiece that is to be machined so as to form a longeron landing 30*a-c*. Furthermore, each block 44*a-c* includes a surface that is substantially parallel with a respective surface of the workpiece that is to be machined so as to form a longeron landing 30*a-c*. In particular, the first block 44*a* is proximate to and substantially parallel with the surface of the workpiece that is to be machined so as to form the first longeron landing 30*a*. Similarly, the second block 44*b* is proximate to and substantially parallel with the surface of the workpiece that is to be machined so as to form the second longeron landing 30*b*. Similarly, the third block 44*c* is proximate to and substantially parallel with the surface of the workpiece that is to be machined so as to form the third longeron landing 30*c*.

The positions of the blocks 44*a-c* in the second digital model may be determined using the positions of the longeron landings 30*a-c* in the first digital model.

In some embodiments, a coordinate measuring machine (CMM) is used to inspect the locator pins 42 and/or the blocks 44*a-c*. The frame machining fixture 40 may be further processed, i.e. adjusted, to ensure that the frame machining fixture 40 is as specified by the second digital model, for example, the locator pins 42 and/or the blocks 44*a-c* may be further machined dependent upon the CMM measurements. This processes of measuring and adjusting the machining fixture may be performed iteratively.

At step s14, a coordinate measuring machine (CMM) measures the relative locations of the fixture attachment features 32 of the workpiece produced at step s8.

At step s16, using the CMM measurements of the fixture attachment features 32 on the workpiece, a computer determines a datum, hereinafter referred to as the "frame datum". The frame datum is a reference system, with respect to the attachment features, from which measurements may be made. The frame datum may be computed using any appropriate software package, for example, the Valisys (Trademark) software package.

At step s18, the CMM measures the surface of the workpiece with respect to the frame datum. Thus, the locations of points on the surface of the workpiece with respect to the fixture attachment features 32 are determined.

At step s20, the workpiece is fixedly secured to the frame machining fixture 40 by placing the workpiece onto the upper surface of the base portion 41 such that each locator pin 42 is coupled to (i.e. positioned through) a respective fixture attachment feature 32. The locator pins 42 may be threaded and the workpiece may be secured to the threaded locator pins 42 by screwing nuts onto the threaded pins.

Figure 6:
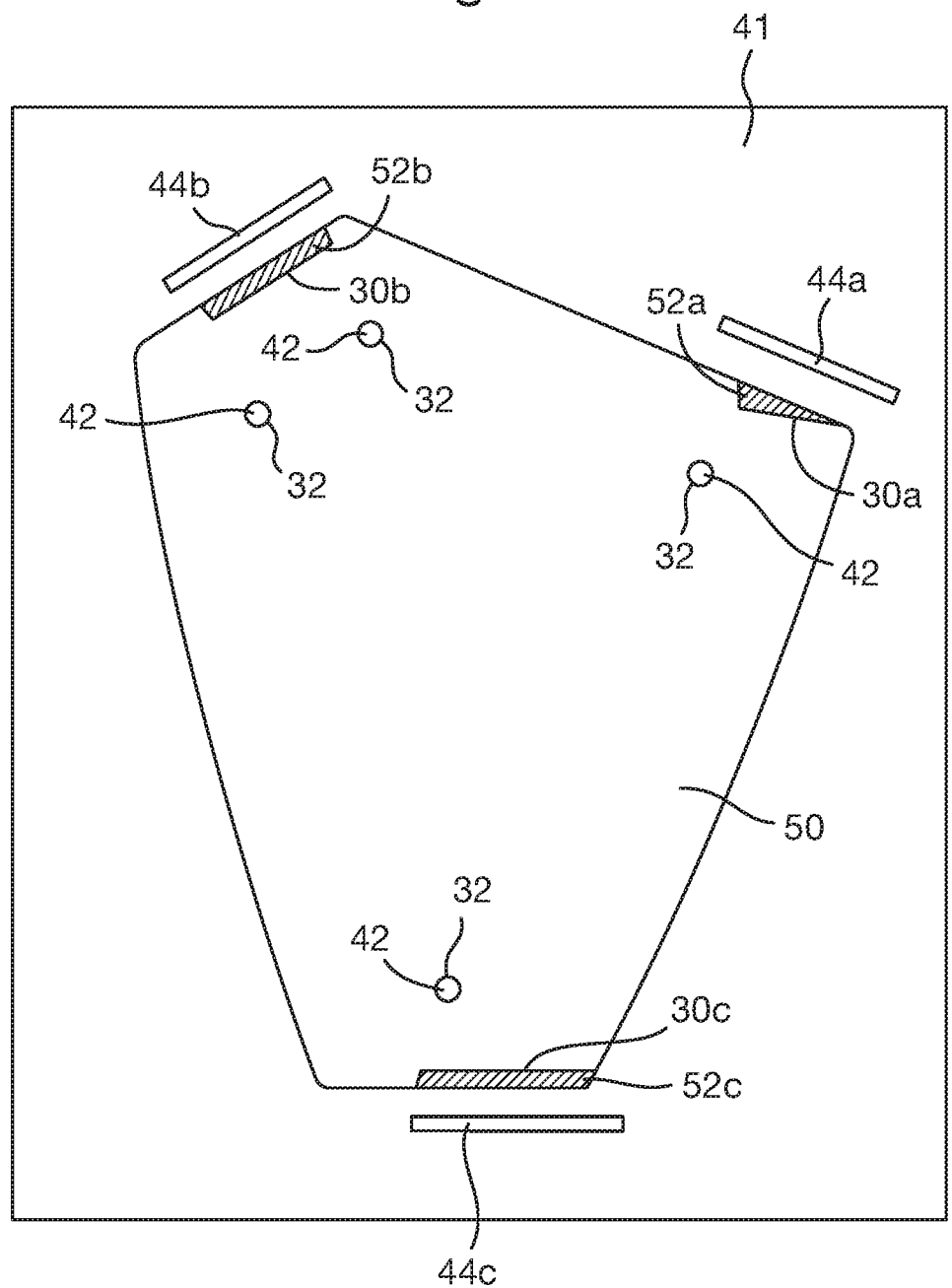
FIG. 6 is a schematic illustration (not to scale) showing a top-down view of a workpiece coupled to the frame machining fixture.

FIG. 6 is a schematic illustration (not to scale) showing a top-down view of the workpiece 50 coupled to the frame machining fixture 40.

The three portions of the workpiece 50 that are to be machined so as to produce the longeron landings 30*a-c* are hereinafter referred to as the "excess portions" and are indicated in FIG. 6 by hashed regions and the reference numerals 52*a-c*. As shown in FIG. 6, the blocks 44*a-c* provide surfaces that are proximate to and substantially parallel with the surfaces of the workpiece 50 that are to be machined to form the longeron landings 30*a-c*.

At step s22, while the workpiece 50 is attached to the frame machining fixture 40, the 5-axis CNC milling machine machines the workpiece so as to remove the excess portions 52*a-c*, thereby forming the longeron landings 30*a-c* and producing the first frame.

In this embodiment, the first excess portion 52*a* of the workpiece 50 is removed/machined so as to form the first longeron landing 30*a*. Also, the second excess portion 52*b* of the workpiece 50 is removed/machined so as to form the second longeron landing 30*b*. Also, the third excess portion 52*c* of the workpiece 50 is removed/machined so as to form the third longeron landing 30*c*.

In this embodiment, the removal of the first excess portion 52*a* is performed as follows.

Firstly, the 5-axis CNC milling machine probes the surface of the first block 44*a*, for example, by moving so as to contact with the surface of the first block 44*a* that is parallel with the surface of the workpiece 50 to be machined. In this way, the CNC milling machine determines the location of its cutting tool in space with respect to the frame datum.

In this embodiment, the positional relationship between the blocks 44*a-c* and the locator pins 42 is known from the second digital model. Also, when the workpiece 50 is coupled to the frame machining fixture 40, the locator pins 42 are substantially collocated with the fixture attachment features 32 of the workpiece 50. Thus, the positions of the blocks 40*a-c* with respect to the frame datum are known. Thus, when CNC machine probes (i.e. contacts with) the first block 44*a*, the position of the cutting tool with respect to the frame datum is known/determined with relatively high accuracy.

Secondly, using the known position of the cutting tool, the measurements of the surface of the workpiece taken at step s18, and the first digital model (which specifies the shape of the first longeron landing 30*a*), the CNC machine machines away the first excess portion 52*a* of the workpiece 50 so as to form the first longeron landing 30*a*. In this embodiment, this machining is performed by moving the cutting tool with respect to the frame datum such that the first longeron landing 30*a* is formed with a high degree of accuracy relative to the frame datum, i.e. the fixture attachment features 32. Preferably, the cutting tool is moved from the surface of the first block 44*a* that is parallel with the surface of the workpiece 50 to be machined, in only a single direction, i.e. along only a single axis. This limited movement of the cutting tool from the block advantageously tends to reduce errors.

The removal of the second and third excess portions 52*b*, 52*c* to form the second and third longeron landings 30*b*, 30*c* respectively is performed using an analogous method to that described above for the forming of the first longeron landing 30*a*. Thus, in this embodiment, the longeron landings 30*a-c* are formed with high accuracy with respect to the frame datum (i.e. the fixture attachment features 32).

Thus, a process of producing the first frame 8 is provided.

In some embodiments, measurements of the positions of the blocks 44*a-c* relative to the locator pins 42 may be used to determine the positions of the blocks 44*a-c* in the frame datum.

In some embodiments, measurements of the surface of the frame machining fixture 40 (e.g. taken using a CMM) are used to create the "frame datum". For example, the frame datum may be created using measurements of the locator pins 42 on the frame machining fixture 40.

An embodiment of a process of producing the airframe 6 described in more detail above with reference to FIG. 2 will now be described.

Figure 7:
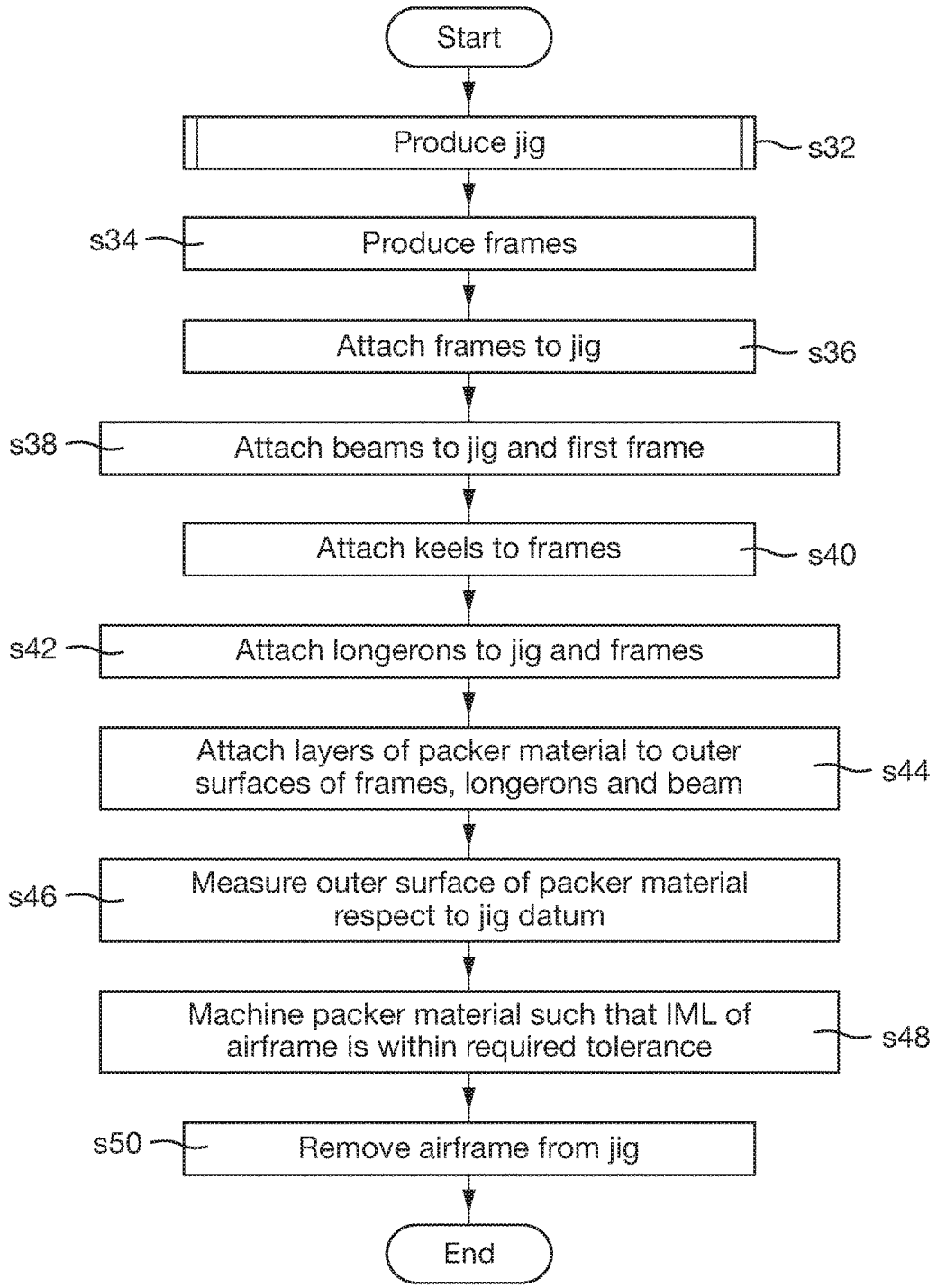
FIG. 7 is a process flow chart showing certain steps of an embodiment of a process of producing the airframe.

FIG. 7 is a process flow chart showing certain steps of an embodiment of a process of producing the airframe 6.

At step s32, an assembly jig is produced. A process of producing the jig is described in more detail later below with reference to FIG. 12.

Figure 8:
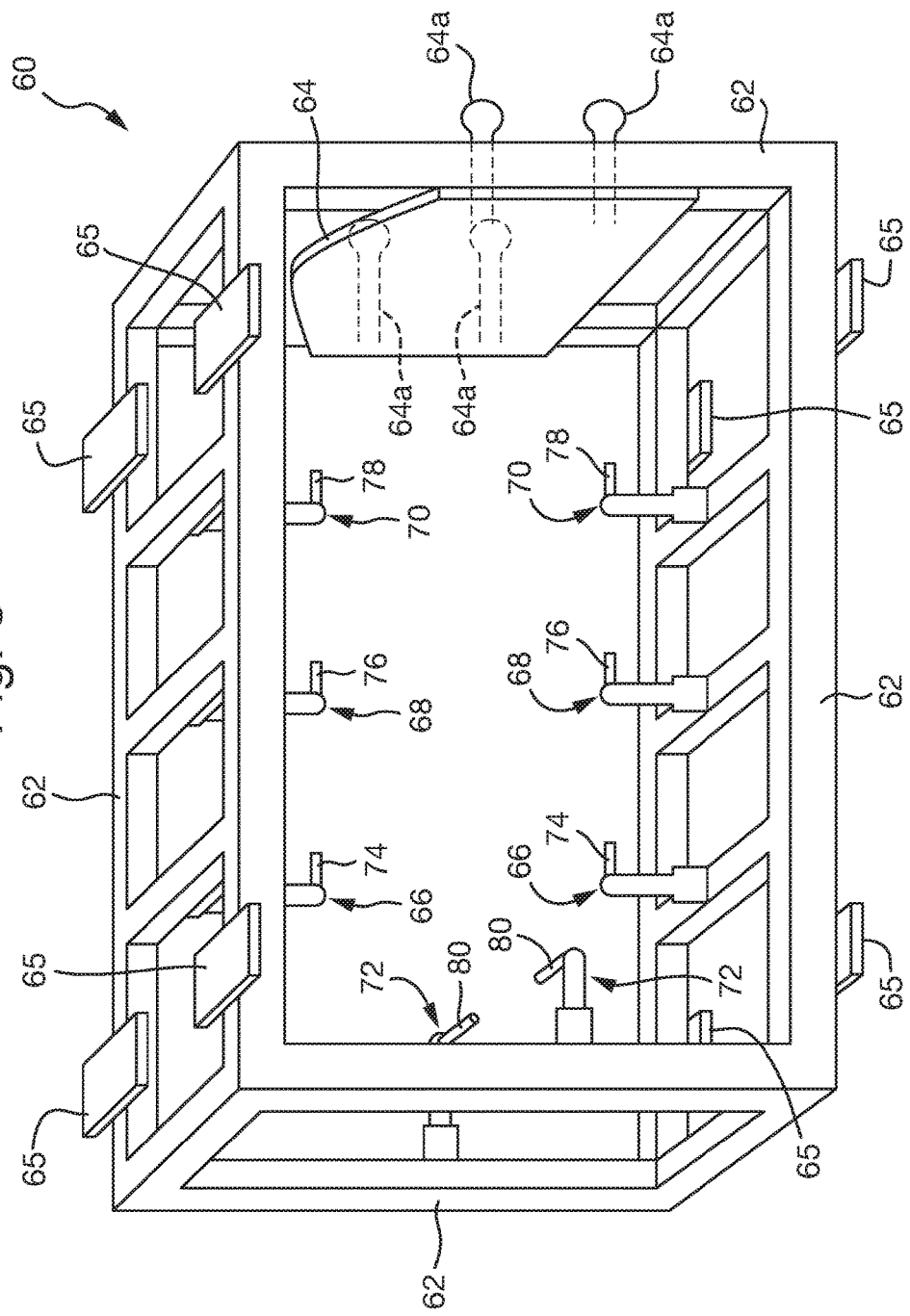
FIG. 8 is a schematic illustration (not to scale) showing a perspective view of an embodiment of an assembly jig.

FIG. 8 is a schematic illustration (not to scale) showing a perspective view of an embodiment of the jig 60 produced at step s32.

In this embodiment, the jig 60 comprises a steel jig frame 62 comprising a plurality of steel beams that are attached together (e.g. by welding) to form a rectangular parallelepiped.

The jig 60 further comprises a steel reference frame 64 attached (e.g. by welding) to one end of the jig frame 62. In this embodiment, the reference frame 64 is, in effect, a copy of the fore fuselage frame to which, during assembly of the aircraft 2, the aft fuselage 4 is to be attached. In other words, the reference frame 64 is substantially the same as the frame of the fore fuselage 5 to which the second free ends 14*b*, 16*b*, 18*b* of the longerons 14, 16, 18 are to be attached.

In this embodiment, the reference frame 64 comprises a plurality of protrusions 64*a*. The reference frame 64 is attached to the jig frame 62 such that the protrusions 64*a* extend from the end of the jig frame 62 to which the reference frame 64 is attached, away from the jig frame 62. In this embodiment, each of the protrusions 64*a* comprises a fastener head at a distal end of that protrusion 64*a*, and a shank portion connecting the fastener head of that protrusion 64*a* to the reference frame 64. The fastener heads of the protrusions 64*a* each have a first diameter. The shank portions heads of the protrusions 64*a* each have a second diameter. The second diameter is less than the first diameter.

The jig further comprises a plurality of metal plates, hereinafter referred to as "jig plates" and indicated by the reference numerals 65. In this embodiment, a first plurality of jig plates 65 is disposed on the uppermost surface of the jig frame 62. The jig plates 65 of this first plurality are in a spaced apart relation on the upper surface of the jig frame 62. Also, a second plurality of jig plates 65 is disposed on the lowermost surface of the jig frame 62. The jig plates 65 of this second plurality are in a spaced apart relation on the lower surface of the jig frame 62. The jig plates 65 act as "feet" for the jig 60. In use, either the first plurality or the second plurality of jig plates 65 contact with the ground, and may be secured to the ground, for example, using bolts.

The jig 60 further comprises four sets of pickup devices, hereinafter referred to as "jig pickups". Preferably, the jig pickups are of universal construction. In this embodiment, each jig pickup comprises a mounting element for mounting the device on the jig frame 62, a receiving element for carrying an airframe component, and a plurality of elongate members having predetermined lengths connected together by means of clamping elements so as to allow six degrees of freedom of movement of the receiving element around three orthogonal axes. Examples of appropriate jig pickups include, but are not limited to, those described in EP1230124 and EP1600379, each of which is incorporated in its entirety herein by reference. The pick-up devices may be formed from aluminium.

Each of the first set of jig pickups is indicated in FIG. 8 by the reference numeral 66. Each of the second set of jig pickups is indicated in FIG. 8 by the reference numeral 68. Each of the third set of jig pickups is indicated in FIG. 8 by the reference numeral 70. Each of the fourth set of jig pickups is indicated in FIG. 8 by the reference numeral 72.

As described in more detail later below with reference to FIG. 12, the first jig pickups 66 are configured to securely hold the first frame 8 in a predetermined position relative to the reference frame 64.

In this embodiment, each of the first jig pickups 66 is attached to the jig frame 62, e.g. by bolts or welding. Attachment using bolts advantageously tends to permit adjustment of the first jig pickups 66 so that their positions on the jig frame 62 are in accordance with a digital model that specifies those positions, and also allows for the removal of the first jig pickups 66 from the jig frame 62. Each of the first jig pickups 66 comprises an elongate arm to which is attached a receiving element 74, hereinafter referred to as a "first receiving element". Each of the first receiving elements 74 is configured to couple to a respective fixture attachment feature 32 of the first frame 8.

For ease of illustration, only two first jig pickups 66 are shown in FIG. 8. However, in reality, the number of first jig pickups 66 is such that the number of first receiving elements 74 is equal to the number of fixture attachment features 32 of the first frame 8.

As described in more detail later below with reference to FIG. 12, the second jig pickups 68 are configured to securely hold the second frame 10 in a predetermined position relative to the reference frame 64.

In this embodiment, each of the second jig pickups 68 is attached to the jig frame 62, e.g. by bolts or welding. Each of the second jig pickups 68 comprises an elongate arm to which is attached a receiving element 76, hereinafter referred to as a "second receiving element". Each of the second receiving elements 76 is configured to couple to a respective attachment feature of the second frame 10.

For ease of illustration, only two second jig pickups 68 are shown in FIG. 8. However, in reality, the number of second jig pickups 68 is such that the number of second receiving elements 76 is equal to the number of attachment features of the second frame 10.

As described in more detail later below with reference to FIG. 12, the third jig pickups 70 are configured to securely hold the third frame 12 in a predetermined position relative to the reference frame 64.

In this embodiment, each of the third jig pickups 70 is attached to the jig frame 62, e.g. by bolts or welding. Each of the third jig pickups 70 comprises an elongate arm to which is attached a receiving element 78, hereinafter referred to as a "third receiving element". Each of the third receiving elements 78 is configured to couple to a respective attachment feature of the third frame 12.

For ease of illustration, only two third jig pickups 70 are shown in FIG. 8. However, in reality, the number of third jig pickups 70 is such that the number of third receiving elements 78 is equal to the number of attachment features of the third frame 12.

As described in more detail later below with reference to FIG. 12, the fourth jig pickups 72 are configured to securely hold the second ends of the beams 20, 22 in a predetermined position relative to the reference frame 64.

In this embodiment, each of the fourth jig pickups 72 is attached to the jig frame 62, e.g. by bolts or welding. Each of the fourth jig pickups 72 comprises an elongate arm to which is attached a receiving element 80, hereinafter referred to as a "fourth receiving element". Each of the fourth receiving elements 80 is configured to couple to a respective attachment feature of a beam 20, 22.

For ease of illustration, only two fourth jig pickups 72 are shown in FIG. 8. However, in reality, the number of fourth jig pickups 72 is such that the number of fourth receiving elements 80 is equal to the number of attachment features of the beams 20, 22.

At step s34, each of the frames 8, 10, 12 are produced as described in more detail earlier above with reference to FIG. 4.

At step s36, the frames 8, 10, 12 are attached to the jig 60.

In particular, in this embodiment the first frame 8 is attached to the first jig pickups 66 such that each of the first receiving elements 74 is coupled to a respective fixture attachment feature 32 of the first frame 8. Thus, the first frame 8 is fixedly attached to the jig 60 at a predetermined position relative to the reference frame 64. In this embodiment, as described in more detail later below with reference to FIG. 12, the position on the jig 60 of the first frame 8 with respect to the reference frame 64 is the same as the desired position on the assembled aircraft 2 of the first frame 8 with respect to the fore fuselage frame.

Also, in this embodiment the second frame 10 is attached to the second jig pickups 68 such that each of the second receiving elements 76 is coupled to a respective attachment feature of the second frame 10. Thus, the second frame 10 is fixedly attached to the jig 60 at a predetermined position relative to the reference frame 64. In this embodiment, as described in more detail later below with reference to FIG. 12, the position on the jig 60 of the second frame 10 with respect to the reference frame 64 is the same as the desired position on the assembled aircraft 2 of the second frame 10 with respect to the fore fuselage frame.

Also, in this embodiment the third frame 12 is attached to the third jig pickups 70 such that each of the third receiving elements 78 is coupled to a respective attachment feature of the third frame 12. Thus, the third frame 12 is fixedly attached to the jig 60 at a predetermined position relative to the reference frame 64. In this embodiment, as described in more detail later below with reference to FIG. 12, the position on the jig 60 of the third frame 12 with respect to the reference frame 64 is the same as the desired position on the assembled aircraft 2 of the third frame 12 with respect to the fore fuselage frame.

At step s38, the beam 20 is attached to the jig 60 and the first frame 8.

In this embodiment, the beam 20 comprises one or more attachment features, i.e. through holes, proximate to its second end. In this embodiment, the beam 20 is attached to the fourth jig pickups 72 such that each of the fourth receiving elements 80 is coupled to a respective attachment feature of the beam 20. Also, the first end of the beam 20 is attached, e.g. by bolts, to the first frame 8. Thus, the beam 20 is fixedly attached to the jig 60 and the first frame 8. In this embodiment, the beam 20 is attached to the jig 60 such that the second end of the beam 20 is at a predetermined position relative to the reference frame 64. In this embodiment, as described in more detail later below with reference to FIG. 12, the position on the jig 60 of the second end of the beam 20 with respect to the reference frame 64 is the same as the desired position on the assembled aircraft 2 of the second end of the beam 20 with respect to the fore fuselage frame.

At step s40, the keels are attached between adjacent frames 8, 10, 12 e.g. by bolting. In this embodiment, the keels not directly attached to the jig 60 e.g. by pickups, and instead are attached to the frames 8, 10, 12 only.

At step s42, the longerons 14, 16, 18 are attached to the jig 60 and the first frame 8.

In particular, in this embodiment, the first longeron 14 is attached to the first longeron landing 30a of the first frame 8, a first longeron landing of the second frame 10, and a first longeron landing of the third frame 12. Also, the second free end 14b of the first longeron 14 may be attached to a feature of the reference frame 64 that corresponds to a feature of the fore fuselage frame to which, during assembly of the aircraft 2, the second free end 14b of the first longeron 14 is to be attached. In some embodiments, the first free end 14a of the first longeron 14 may be attached to the first frame 8 and/or the jig 60 e.g. to a jig pickup.

Also, in this embodiment, the second longeron 16 is attached to the second longeron landing 30b of the first frame 8, a second longeron landing of the second frame 10, and a second longeron landing of the third frame 12. Also, the second free end 16b of the second longeron 16 may be attached to a feature of the reference frame 64 that corresponds to a feature of the fore fuselage frame to which, during assembly of the aircraft 2, the second free end 16b of the second longeron 16 is to be attached. In some embodiments, the first free end 16a of the second longeron 16 may be attached to the first frame 8 and/or the jig 60 e.g. to a jig pickup.

Also, in this embodiment, the third longeron 18 is attached to the third longeron landing 30c of the first frame 8, a third longeron landing of the second frame 10, and a third longeron landing of the third frame 12. Also, the second free end 18b of the third longeron 18 may be attached to a feature of the reference frame 64 that corresponds to a feature of the fore fuselage frame to which, during assembly of the aircraft 2, the second free end 18b of the third longeron 18 is to be attached. In some embodiments, the first free end 18a of the third longeron 18 may be attached to the first frame 8 and/or the jig 60 e.g. to a jig pickup.

As the longeron landings of the frames 8, 10, 12 have been machined with high accuracy with respect to the fixture attachment features 32 of the frames 8, 10, 12 (i.e. to the frame datums), and the frames 8, 10, 12 have been located on jig 60 at predetermined positions with respect to the reference frame 64 using the fixture attachment features 32 of the frames 8, 10, 12, when the longerons 14, 16, 18 are attached to the longeron landings, the longerons 14, 16, 18 tend to be accurately located at predetermined positions with respect to the reference frame 64. In this embodiment, the positions on the jig 60 of the longerons 14, 16, 18 with respect to the reference frame 64 is the same as the desired position on the assembled aircraft 2 of the third frame 12 with respect to the fore fuselage frame.

A step s44, sacrificial plies or layers of material, which are collectively referred to hereinafter as "packer material" are applied, e.g. using an adhesive, to the surfaces of the airframe components (i.e. the surfaces of the frames 8, 10, 12, the longerons 14, 16, 18, and the beam 20) to which the aircraft skin is to be attached.

In this embodiment, the packer material is applied to the airframe components after the airframe 6 has been assembled in the jig 60. However, in other embodiments, the packer material is applied to the airframe components prior to the airframe 6 being assembled in the jig 60.

Steps s46 to s58 of the process of FIG. 7 will be described in more detail later below after a description of the packer material and its application to the airframe components.

Figure 9:
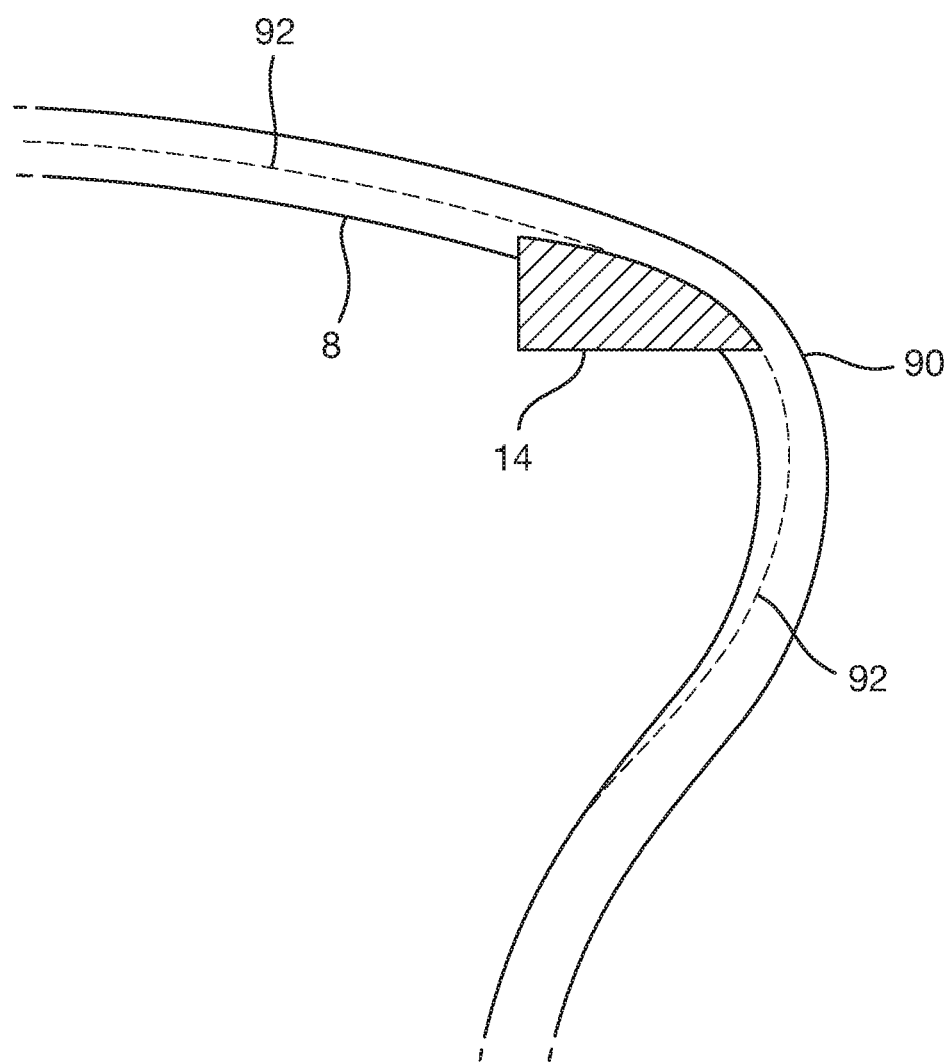
FIG. 9 is a schematic illustration (not to scale) showing packer material applied to an outer surface of the components of the airframe.

FIG. 9 is a schematic illustration showing packer material 90 applied to a surface of the first frame 8 and the first longeron 14.

The desired IML for the airframe 6 is shown in FIG. 9 as a dotted line and is indicated by the reference numeral 92. The IML 92 may be specified in the digital model of the airframe 6 or aft fuselage 4.

In this embodiment, the packer material 90 is made of a composite material such as a fibre-reinforced polymer, i.e. a polymer matrix reinforced with fibres (e.g. carbon or glass fibres). The packer material 90 is a different material to that/those from which the airframe components are made In this embodiment, the packer material 90 is of sufficient thickness to provide that desired IML 92 is at or beneath the outer surface of the packer material 90. The thickness for the packer material may be determined by performing a tolerance analysis using a detail stage inspection of the components and determined assembly tolerances. In some embodiments, the thickness of the packer material is 1.75 mm to 2.29 mm, e.g. 2.03 mm.

In some embodiments, packer material 90 is not added to some or all of the surfaces of the airframe components. For example, in some embodiments, if the outer surface of an airframe component is located at the desired IML 92, packer material 90 is not added to that surface.

The application of the packer material 90 to the components of the airframe 6 may be performed in any appropriate way. In some embodiments, the packer material 90 comprises flat sheets which are pressed against and attached to the components of the airframe 6. Alternatively, the packer material 90 may be shaped to fit against, i.e. be complementary to, the components of the airframe 6. For example, the packer material 90 may be moulded into an appropriate shape by applying the packer material 90 to a mould tool and curing the packer material 90 in an autoclave.

Figure 10:
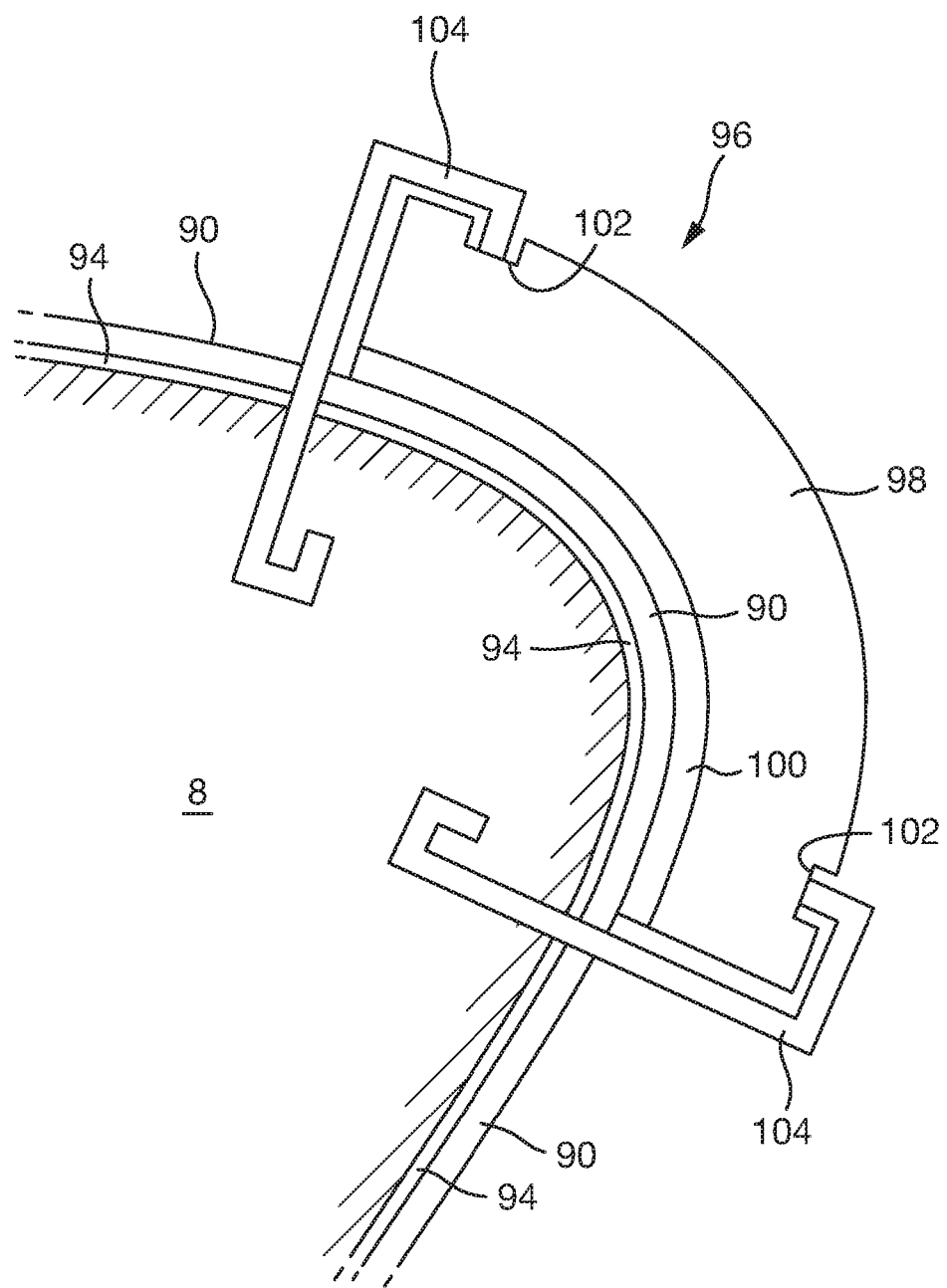
FIG. 10 is a schematic illustration (not to scale) showing an example way in which the packer material may be applied to a surface of an airframe component.

FIG. 10 is a schematic illustration showing an example way in which the packer material 90 may be applied to an outer surface of the first frame 8.

In this embodiment, an adhesive 94 is used to adhere the packer material 90 to the first frame 8. An over press tool 96 is used to hold the packer material 90 in place while the adhesive 94 cures or solidifies.

In this embodiment, the over press tool 96 comprises a rigid body portion 98 (also referred to as a "strong back") and a deformable portion 100. The body portion 98 is substantially non deformable. The body portion 98 comprises a plurality of clamp receiving elements 102 for receiving respective clamp devices 104 such as G-clamps.

In use, the over press tool 96 is positioned onto a portion of the airframe 6 such that packer material 90 is between the over press tool 96 and the first frame 8, and such that the deformable portion 100 of the over press tool 96 is in contact with the packer material 90. The over press tool 96 is then attached to and pressed against the packer material 90 and first frame 8 using a plurality of clamp devices 104 which engage with the clamp receiving elements 102 of the body portion 98 and the first frame 8. The over press tool 96 remains in place until the adhesive 94 has cured and the packer material 90 is securely attached to the first frame 8, at which point the clamp devices 104 and the over press tool 96 are removed.

In this embodiment, the over press tool 96 is shaped to be complementary to a part of the first frame to which the packer material is to be applied. The first digital model (i.e. the digital model of the first frame 8) may be used to specify a shape for the over press tool 96 and/or specify a digital model for producing the over press tool 96. The body portion 98 may then be produced using an appropriate process, such as an Additive Layer Manufacturing (ALM) process, from any appropriate material, such as plastic.

The deformable portion 100 advantageously tends to provide that the force exerted by the over press tool 96 onto the packer material 90 is substantially evenly distributed. Furthermore, the deformable portion 100 tends to facilitate the use of the over press tool 96 in cases where there are assembly positioning errors etc.

In this example, the over press tool 96 is held against the packer material 90 and first frame 8 using a plurality of clamp devices 104. However, in other examples, the over press tool 96 may be held against the packer material 90 and an airframe component in a different way.

Figure 11:
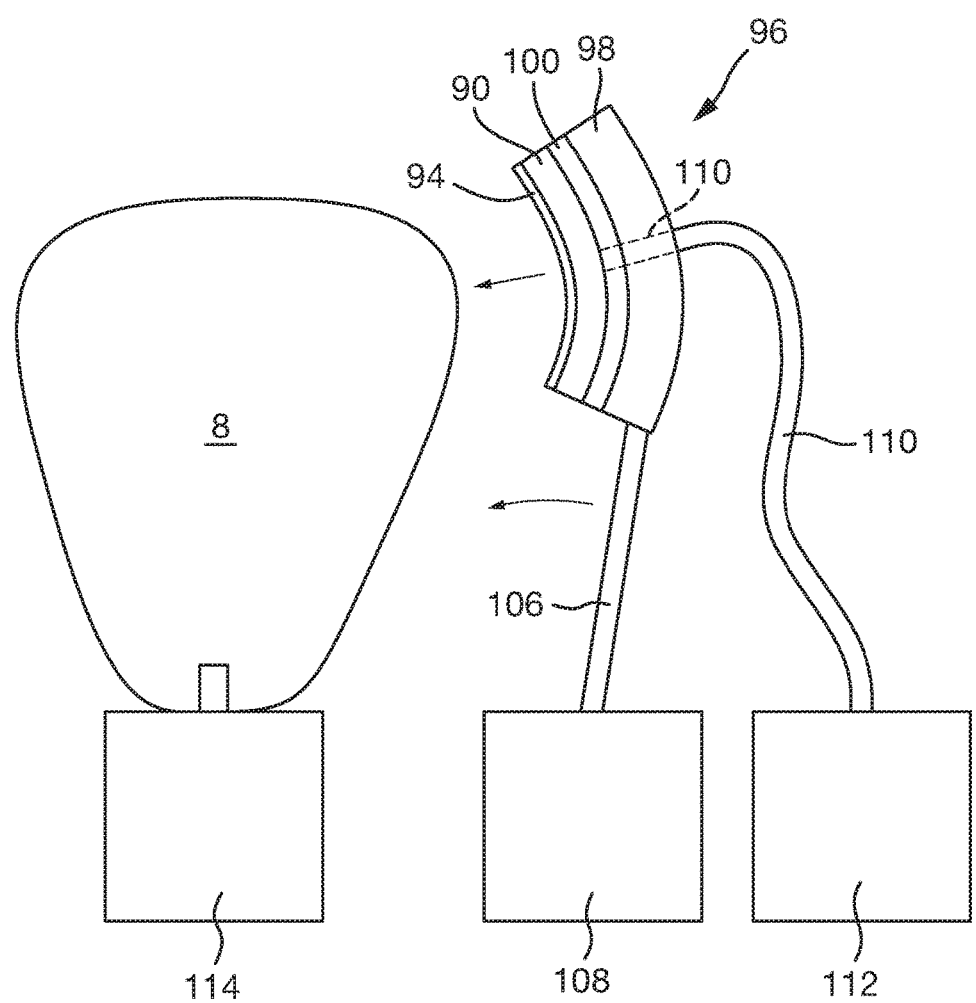
FIG. 11 is a schematic illustration (not to scale) showing a further example way in which the packer material may be applied to a surface of an airframe component.

FIG. 11 is a schematic illustration showing a further example way in which the packer material 90 may be applied to an outer surface of the first frame 8.

In this embodiment, the over press tool 96 further comprises a rigid arm 106 connecting the body portion 98 to an actuation device 108. The actuation device 108 may, for example be a pneumatic or hydraulic actuation device 108 configured to actuate the over press tool 96. The over press tool 96 further comprises a vacuum line 110 connecting the surface of the deformable portion 100 to a vacuum pump 112.

In operation, the first frame 8 is securely held by a support structure 114 (e.g. the jig 60). The packer material 90 is held onto the deformable portion 100 of the over press tool 96 by establishing a vacuum in the vacuum line 110. The over press tool 96 is then actuated by the actuation device 108 in such a way that the packer material 90 coupled to the over press tool 96 is brought into contact with the first frame 8 (i.e. the over press tool 96 is moved in the direction of the arrows in FIG. 11) and firmly pressed against the first frame 8 until the adhesive 94 cures. The vacuum holding the packer material 90 to the over press tool 96 may then be released and the over press tool 96 may be moved away from the first frame 8 leaving the packer material 90 adhered thereto.

Having the packer material 90 be retained against the over press tool 96 and subsequently bringing the packer material 90 coupled to the over press tool 96 into contact with the first frame 8 (as opposed to applying the packer material 90 to the first frame and subsequently bringing the over press tool into contact with the packer material 90 on the first frame 8) advantageously tends to reduce unwanted movement of the packer material 90 with respect to the first frame 8. For example, a likelihood of the packer material 90 that is applied to the first frame 8 moving with respect to the first frame 8 when the over press tool 96 is brought into contact with the packer material 90 on the first frame 8 tends to be reduced or eliminated. Thus, accuracy with which packer material 90 is applied to an object tends to be increased.

Furthermore, having the packer material 90 be retained against the over press tool 96 and subsequently bringing the packer material 90 coupled to the over press tool 96 into contact with the first frame 8 tends to reduce the likelihood of the packer material 90 adhering to the first frame 8 before a pressing force is applied. This tends to improve adherence of the packer material to the object.

Returning now to the process of FIG. 7, at step s46, optionally, a laser tracker or CMM is used to measure the outer surface of the packer material 90 that has been applied to the components of the airframe 6. In this embodiment, the outer surface of the packer material 90 is measured with respect to a so-called "jig datum" which will be described in more detail later below with reference to FIG. 12. In some embodiments, this step may be omitted or may be performed at a later stage.

At step s48, a CNC cutting device is used to machine the packer material 90 such that the outer surface of the packer material 90 is located at the IML 92 specified in the digital model of the airframe 6 or aft fuselage 4 with respect to the fore reference frame 64. Optionally, this may be performed using the laser tracker measurements taken at step s46. In this embodiment, the CNC cutting device is controlled with respect to the "jig datum" *which is described in more detail later below.

Thus, the packer material 90 is machined to allow for variations in component thicknesses and substructure assembly positioning errors. This tends to provide that, when the aircraft skin is attached to the airframe 6, the OML of the aft fuselage 4 is within the pre-specified tolerance with respect to the fore reference frame 4 (i.e. fore fuselage in the assembled aircraft 2). Furthermore, the machined packer material 90 provides a consistent landing surface to which the aircraft skin may be fixed. The landing surface provided by the machined packer material 90 is accurately positioned with respect to the jig datum.

Use of the sacrificial packer material 90 advantageously tends to reduce or eliminate a need to machine the surfaces of the airframe components (i.e. the surfaces of the frames 8, 10, 12, the longerons 14, 16, 18, and the beam 20) to which the aircraft skin is to be attached. Thus, a need for performing post-machining analysis/testing of the airframe components may be avoided or reduced.

Use of the packer material 90 advantageously tends to reduce or eliminate a need for shims to be applied to fill gaps between the airframe 6 and the external aircraft skin when the aircraft skin is attached to the airframe 6.

Steps s46 and s48 may be performed iteratively.

Thus, the airframe 6 is assembled using the jig 60.

At step s50, the assembled airframe 6 may be removed from the jig 60. In this embodiment, the reference frame 64 remains attached to the airframe 6, and is also detached from the jig frame 62.

Thus, an embodiment of a process of producing the airframe 6 is provided.

Figure 12:
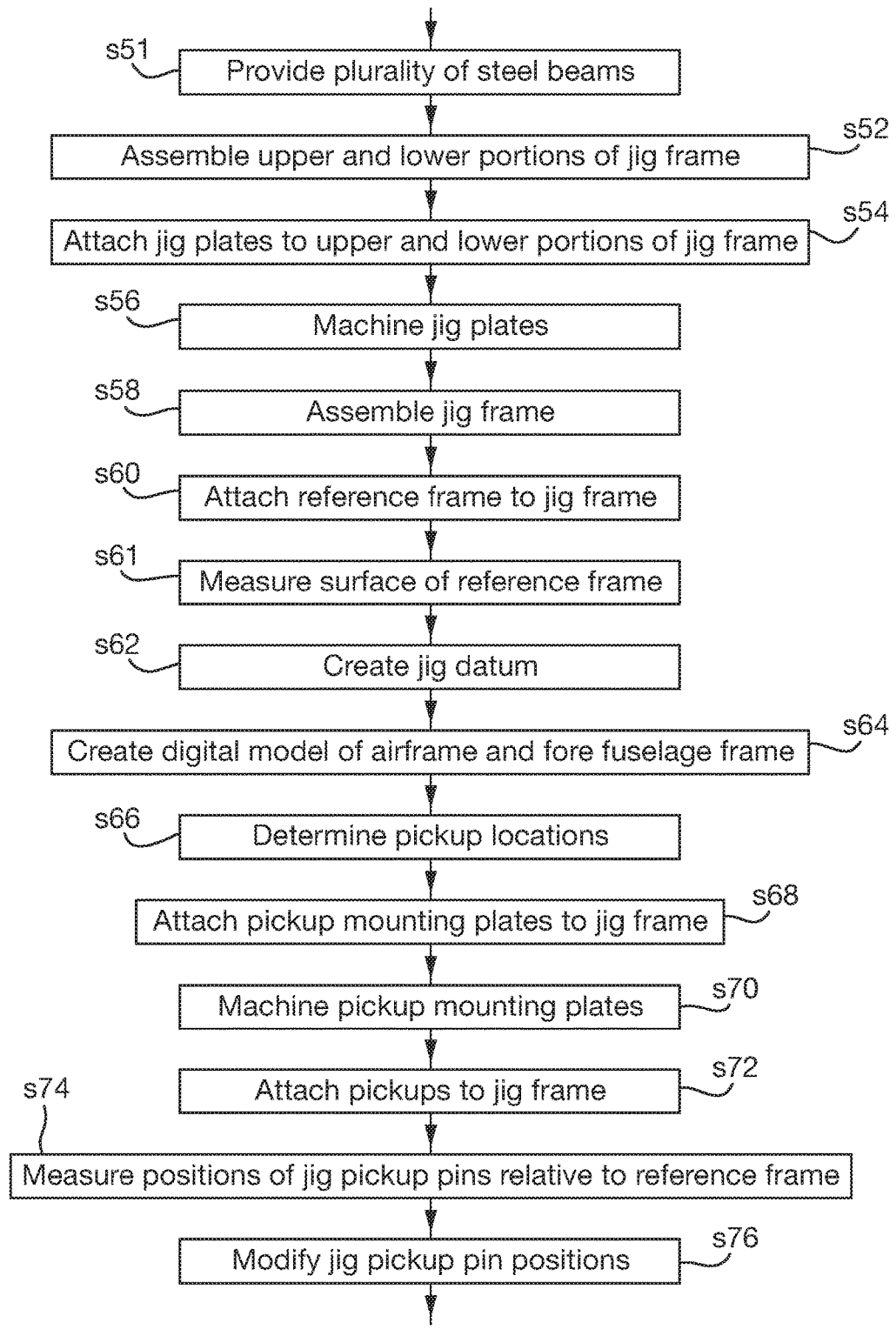
FIG. 12 is a process flow chart showing certain steps of an embodiment of a process of producing the jig.

Returning now to the process of producing the jig 60 performed at step s32, FIG. 12 is a process flow chart showing certain steps of an embodiment of a process of producing the jig 60.

At step s51, a plurality of steel beams from which to construct the jig frame 62 is provided.

At step s52, steel beams are attached together, e.g. by welding, so as to form upper and lower portions of the jig frame 62.

At step s54, jig plates 65 are attached (e.g. by welding) to the assembled upper and lower portions of the jig frame 62.

In particular, in this embodiment, the first plurality of jig plates 65 is attached to the surface of the upper portion of the jig frame 62 that is to form the uppermost surface of the jig frame 62 when the jig frame 62 is assembled. Also, in this embodiment, the second plurality of jig plates 65 is attached to the surface of the lower portion of the jig frame 62 that is to form the lowermost surface of the jig frame 62 when the jig frame 62 is assembled.

At step s56, the jig plates 65 attached to the upper and lower portions of the jig frame 62 are machined.

Figure 13:
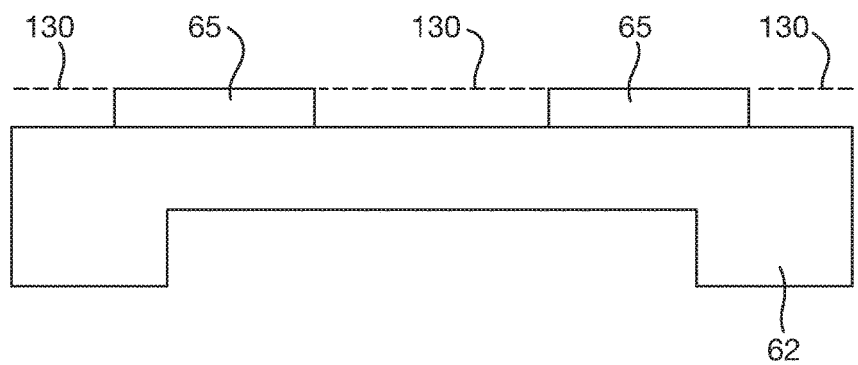
FIG. 13 is a schematic illustration (not to scale) showing a portion of the jig including a plurality of jig plates.

FIG. 13 is a schematic illustration (not to scale) illustrating the machining of the jig plates 65.

In this embodiment, for each of the upper and lower portions of the jig frame 62, and for the jig plates 65 attached to that portion of the jig frame 65, the surfaces of those jig plates 65 that are opposite to the surfaces that are attached to that portion of the jig frame 62 are machined such that they lie in a common plane 130. In particular, the uppermost surfaces of the jig plates 65 of the first plurality are machined such that they lie in a first common plane 130. Similarly, the lowermost surfaces of the jig plates 65 of the second plurality are machined such that they lie in a second common plane.

At step s58, the jig frame 62 is assembled. In this embodiment, the upper and lower portions of the jig frame 62 (with the jig plates 65 attached thereto) are coupled together by further steel beams so as to form a rectangular parallelepiped. An example jig frame and method of construction thereof includes, but is not limited to, those described in EP1230124 and EP1600379, each of which is incorporated in its entirety herein by reference.

At step s60, the reference frame 64 is attached, e.g. by welding, to one end of the jig frame 62. In this embodiment, the reference frame 64 is a substantially exact replica of at least part of the fore fuselage frame to which the airframe 6 of the aft fuselage 4 is to be attached.

At step s61, a CMM measures a surface of the reference frame 64 on the jig 60. In particular, in this embodiment, the CMM measures features of the reference frame 64 that correspond to those features of the fore fuselage frame to which the airframe 6 is to be attached.

At step s62, using the CMM measurements of the reference frame 64, a computer determines a datum, herein referred to as the "jig datum". The jig datum is a reference system, with respect to the reference frame 64, from which measurements may be made. The jig datum may be computed using any appropriate software package.

At step s64, a human designer generates or creates a further digital model, hereinafter referred to as the "third digital model". The third digital model is of the airframe and the fore fuselage frame. The third digital model specifies the positional relationships between the components of the airframe 6 and the fore fuselage frame, when the airframe 6 is attached to the fore fuselage frame.

The third digital model may be created using a computer and an appropriate software package, for example, the Catia (Trademark) V4 software package.

At step s66, using the third digital model, the human designer or a computer determines positions on the jig frame 60 for each of the jig pickups 66, 68, 70, 72.

In this embodiment, the determined locations on the jig 60 of the first jig pickups 66 are such that, were the first frame 8 to be held by the first jig pickups 66, the position of the first frame 8 relative to the reference frame 64 would be substantially the same as a desired position for the first frame 8 relative to the fore fuselage frame onboard the assembled aircraft 2.

Similarly, the determined locations on the jig 60 of the second jig pickups 68 are such that, were the second frame 10 to be held by the second jig pickups 68, the position of the second frame 10 relative to the reference frame 64 would be substantially the same as a desired position for the second frame 10 relative to the fore fuselage frame onboard the assembled aircraft 2.

Similarly, the determined locations on the jig 60 of the third jig pickups 70 are such that, were the third frame 12 to be held by the third jig pickups 70, the position of the third frame 12 relative to the reference frame 64 would be substantially the same as a desired position for the third frame 12 relative to the fore fuselage frame onboard the assembled aircraft 2.

Similarly, the determined locations on the jig 60 of the fourth jig pickups 72 are such that, were the second ends of the beams 20, 22 held by the fourth jig pickups 72, the positions of the second ends of the beams 20, 22 relative to the reference frame 64 would be substantially the same as a desired position for the second ends of the beams 20, 22 relative to the fore fuselage frame onboard the assembled aircraft 2.

At step s68, for each of the jig pickups 66-72, a respective metal plate (hereinafter referred to as "pickup mounting plates") is attached, for example by welding, to the jig frame 62 in the position determined at step s66 for that jig pickup 66-72. The pickup mounting plates provide structures via which the jig pickups 66-72 are attached to the jig frame 62.

At step s70, the pickup mounting plates are machined.

Figure 14:
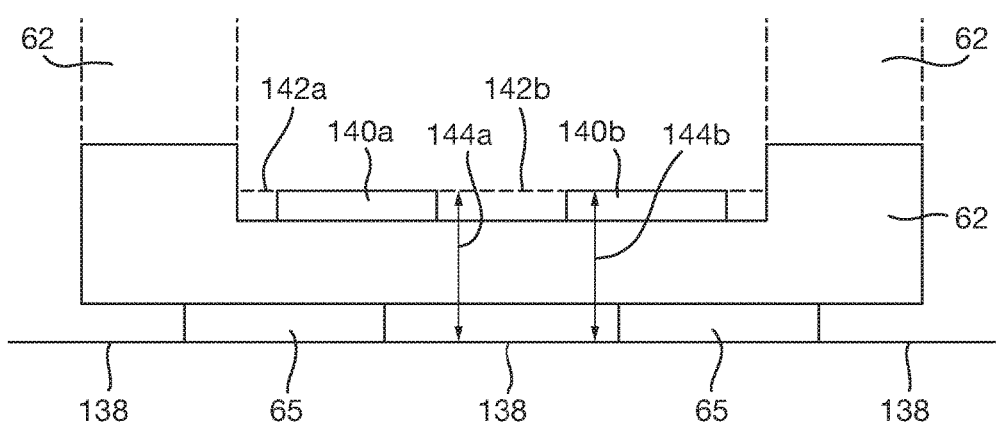
FIG. 14 is a schematic illustration (not to scale) illustrating machining of pickup mounting plates of the jig.

FIG. 14 is a schematic illustration (not to scale) illustrating the machining of the pickup mounting plates.

In this embodiment, for machining the pickup mounting plates 140a-b attached to the upper portion of the jig frame 62, the jig frame 62 is positioned such that the machined surfaces of the jig plates 65 on the upper portion of the jig frame 62 (i.e. the surfaces of those jig plates 65 that lie in the first common plane) are in contact with a flat surface or floor 138. The pickup mounting plates 140a-b attached to the upper portion of the jig frame 62 are then machined such that an upper surface of each of those pickup mounting plates 140a-b lies in a respective plane 142a-b that is substantially parallel to the floor surface 138 (i.e. to the first common plane) and is a respective predetermined height 144a-b above the floor surface 138. The heights 144a-b above the floor surface 138 of the upper surfaces of the pickup mounting plates 140a-b may be the same as each other.

Similarly, in this embodiment, for machining the pickup mounting plates attached to the lower portion of the jig frame 62, the jig frame 62 is positioned such that the machined surfaces of the jig plates 65 on the lower portion of the jig frame 62 (i.e. the surfaces of those jig plates 65 that lie in the second common plane) are in contact with the flat floor 138. The pickup mounting plates attached to the lower portion of the jig frame 62 are then machined such that an upper surface of each of those pickup mounting plates lies in a respective plane that is substantially parallel to the floor surface (i.e. to the second common plane) and is a respective predetermined height above the floor surface 138.

At step s72, each of the jig pickups 66-72 are attached to the flat machined pickup mounting plates 140a-b, e.g. by bolts or by welding, in the position determined at step s66 for that jig pickup.

Advantageously, the surfaces of the pickup mounting plates 140a-b (that have been machined at step s70, and to which the jig pickups 66-72 are mounted) are flat, horizontal surfaces that are a predetermined height above the floor 138. This tends to reduce or eliminate a use of levelling pads or filler when attaching the jig pickups 66-72 to the pickup mounting plates. In turn, this tends to reduce the overall weight of the jig frame 60, making the jig frame 60 more manoeuvrable, and reducing a risk of sagging of the jig frame 62 when the airframe 6 is assembled thereon.

Steps s72 and s74 are optional steps for verifying and, if necessary, adjusting the position and/or orientation of the jig pickups on the jig 60. In some embodiments, these steps are omitted or a different verification and/or different adjustment process is performed. Steps s72 and s74 may be performed iteratively.

At step s74, a laser tracker measures the position of each of the jig receiving elements 74-80 with respect to the jig datum, i.e. with respect to the fore reference frame 64.

At step s76, using the laser tracker measurements, the positions of the jig receiving elements 74-80 with respect to the jig datum may be modified to ensure that each of the jig receiving elements 74-80 has the position determined at step s66 for that jig receiving element 74-80. In other words, the positions of the jig receiving elements 74-80 may be modified to ensure that, when the frames 8, 10, 12 are held by the jig receiving elements 74-80, the positions of the frames 8, 10, 12 relative to the reference frame 64 are substantially the same as a desired position for the frames 8, 10, 12 relative to the fore fuselage frame onboard the assembled aircraft 2.

Modifying a position of a jig receiving element 74-80 may be performed by, for example, introducing a shim between a jig pickup and the jig frame 62, or by machining part a jig pickup and/or the jig frame 62.

In some embodiments, the positions of one or more of the jig pickups 66, 68, 70, 72 measured by the laser tracker may be used to update or recalculate the jig datum. For example, in some embodiments, a new jig datum is calculated using measured positions of the reference frame and one or more of the jig receiving elements 74-80. This new jig datum is a reference system, with respect to the reference frame 64 and one or more of the jig receiving elements 74-80, from which measurements may be made.

Thus, an embodiment of a process of producing the jig 60 is provided.

In this embodiment, the aft fuselage 4 of the aircraft 2 comprises two airframes 6 (i.e. a port boom and a starboard boom), those two airframes 6 being substantially mirror images of each other. What will now be described is an embodiment of a process of coupling together the two assembled airframes 6 so as to form the aft fuselage 4. In particular, what will now be described is an embodiment of a process of coupling together the port boom and a starboard boom along a centreline.

Figure 15:
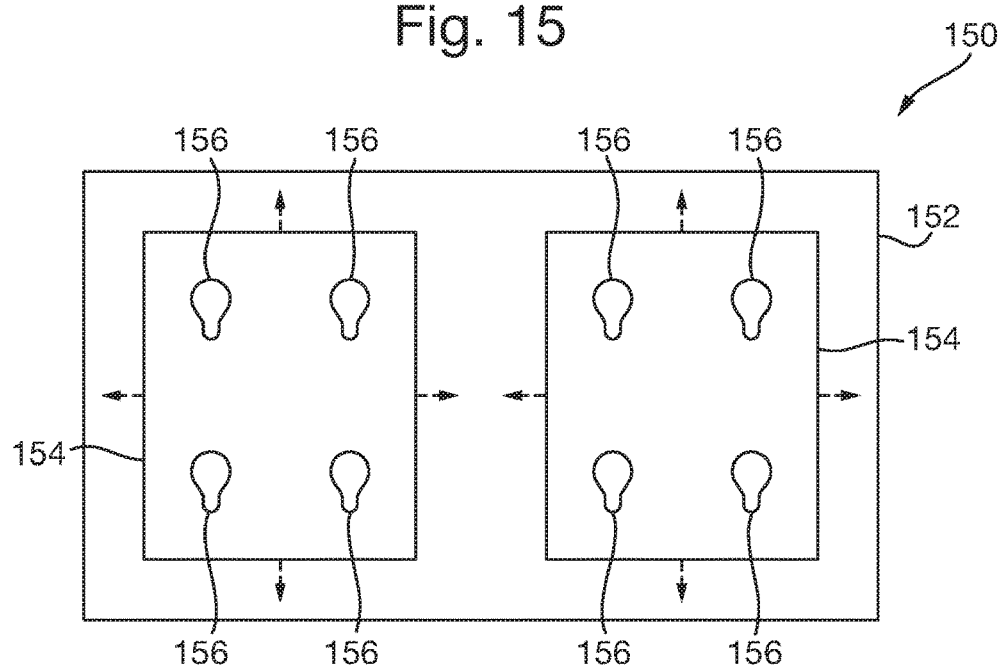
FIG. 15 is a schematic illustration (not to scale) of a front view of a coupling jig that is used to couple together two airframes to form the aft fuselage.

FIG. 15 is a schematic illustration (not to scale) of a front view of a coupling jig 150 that is used to couple together the two airframes 6 so as to form the aft fuselage 4.

In this embodiment, the coupling jig 150 comprises a housing 152 and two airframe receptacles 154. Each airframe receptacle 154 comprises a plurality of keyhole-shaped mounting apertures 156 therein. Each of the apertures 156 has a first portion with a first diameter to closely receive a fastener head of a protrusion 64a of the reference frame 64. Each of the apertures 156 has a second portion with a second width less than the first diameter size to receive a shank portion of a protrusion 64a of the reference frame 64.

In this embodiment, the coupling jig 150 further comprises actuation means (not shown) configured to move the airframe receptacles 154 with respect to on another. In particular, in this embodiment, the actuation means of the coupling jig is configured to move the airframe receptacles 154 as indicated in FIG. 15 by dotted arrows. The coupling jig 150 further comprises a controller (not shown) for controlling operation of the actuation means.

Figure 16:
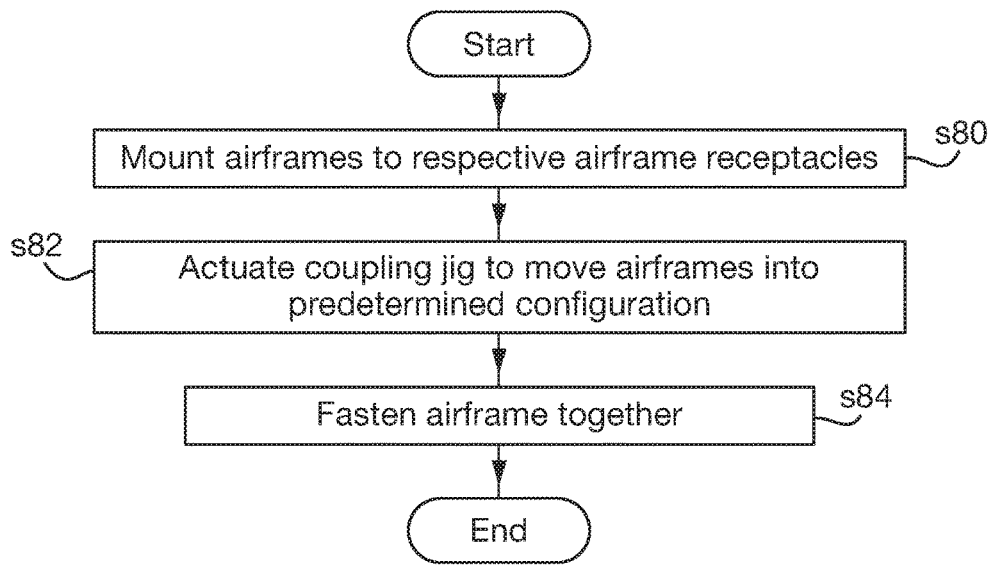
FIG. 16 is a process flow chart showing certain steps of a process of coupling together two assembled airframes so as to form the aft fuselage.

FIG. 16 is a process flow chart showing certain steps of a process of coupling together two assembled airframes 6 so as to form the aft fuselage 4.

Each of the two airframes are assembled as described in more detail above with reference to FIG. 7. Each of the assembled airframe 6 is removed from the respective jig 60 used to assemble that airframe 6, but remains attached to the respective reference frame 64 with respect to which that airframe was assembled. Thus, the reference frames 64 are also removed from their respective jigs 60.

At step s80, each of the two assembled airframes 6 are mounted to respective airframe receptacles 154 of the coupling jig 150.

In this embodiment, each assembled airframes 6 is mounted to respective airframe receptacle 154 as follows. Firstly, the fastener heads of the protrusions 64a of the reference frame 64 to which that airframe 6 is coupled are inserted into the first portions of the apertures 156 of that airframe receptacle 154. Each fastener head is inserted into the first portion of a respective aperture 156. Secondly, the airframe 6 and reference frame 64 to which it is attached are moved so that the shank portions of the protrusions 64a of that reference frame 64 are located in the second portions of the apertures 156. Thus, each of the reference frames 64 are locked into, and fixedly attached to, a respective receptacle 154.

At step s82, the controller of the coupling jig 150 controls the actuation means of the coupling jig 150 to move the receptacles 154 into a predetermined configuration with respect to one another. In this embodiment, this moving of the receptacles 154 moves the two assembled airframes 6 into a predetermined configuration with respect to one another. This predetermined configuration of the airframes 6 with respect to one another is the same as a desired configuration of the airframes 6 with respect to one another on the assembled aircraft 2. Thus, the two assembled airframes 6 are moved so as to form the aft fuselage 4. Furthermore, the positions of the two airframes 6 with respect to the reference frames 64 to which they are attached is substantially the same as the positions on the assembled aircraft 2 of the airframes 6 with respect to the fore fuselage frame.

In this embodiment, the controller of the coupling jig 150 uses a digital model of the aft fuselage 4 to move the receptacles 154 (and the airframes 6 attached thereto). Also, to move the receptacles 154 (and the airframes 6 attached thereto), the controller of the coupling jig 150 uses known positions of the airframes 6 relative to the receptacles 154 when the airframes are attached to the receptacles 154.

At step s84, when the two assembled airframes 6 are in the predetermined configuration with respect to one another, the two assembled airframes 6 are fixedly attached to each other, for example, using a plurality of fasteners, thereby forming the aft fuselage 4.

Thus, a process of coupling together two assembled airframes 6 so as to form the aft fuselage 4 is provided.

An advantage provided by the above described methods and apparatus is that the airframe advantageously is produced within very tight tolerance bounds that tend not to be possible using conventional production techniques. The airframe is produced with high accuracy relative to the reference frame which is representative of a forebody frame to which the airframe is to be attached. In particular, the airframe is produced such that the IML is within very with tight tolerances with respect to the reference frame. Thus, the assembly of the aircraft, and in particular the attaching together of the aft fuselage and the fore fuselage, tends to be facilitated.

Advantageously, the blocks of the frame machining fixture are precision ground with respect to the locator pins of the frame machining fixture (i.e. the frame datum). During production of the frame, each block is used as a "zero point" from which a cutting tool is moved to machine a respective frame longeron landing close to that block. The proximity of the block to the associated longeron landing advantageously tends means that, in order to form a longeron landing, the cutting tool does not have to be moved large distances from a "zero point". Thus, errors tends to be reduced and the accuracy (with respect to the frame datum) with which the longeron landings are formed tends to be increased.

Advantageously, the above described jig tends to use fewer pickups for holding the airframe components compared to conventional assembly jigs. Thus, the weight and cost of the jig tends to be reduced compared to conventional assembly jigs. Furthermore, as airframe components are held by fewer pickups, damage/stresses resulting from a component being held by pickups tends to be reduced.

Advantageously, the longeron landings of the frames are machined with high accuracy with respect to a local frame datum that is defined by frame features that are used to locate that frame in the assembly jig. Thus, because the jig pickups that couple to the frame attachment features are accurately located on the jig in a desired position with respect to the reference frame, when the frames are attached to the jig, the longeron landings are accurately located on the jig in a desired position with respect to the reference frame. Thus, when the longerons are attached to the longeron landings of the frames, the longerons tend to be are accurately located on the jig in a desired position with respect to the reference frame. Accordingly, gaps or spaces between longerons and frames advantageously tend to be minimised. The use shims to fill such gaps or spaces tends to be reduced or eliminated.

The above described methods and apparatus tends to provide that the frames of the airframe may be produced independently from one another. In other words, there tends to be no requirement to machine or process the frames as a set. This independent production of the frames tends to reduce production time of the airframe compared to conventional processes.

A further advantage provided by the above described methods and apparatus is that non-destructive testing and other processes may be performed on individual airframe components separately. This tends to be difficult if, in contrast to the above described method, multiple airframe components are machined as a set in an assembly jig.

Apparatus, including the any of the abovementioned computers or processes for performing any of the above described data processing method steps may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

It should be noted that certain of the process steps depicted in the flowcharts of FIGS. 4, 7, and 9 and described above may be omitted or such process steps may be performed in differing order to that presented above and shown in FIGS. 4, 7, and 9. Furthermore, although all the process steps have, for convenience and ease of understanding, been depicted as discrete temporally-sequential steps, nevertheless some of the process steps may in fact be performed simultaneously or at least overlapping to some extent temporally.

In the above embodiments, an airframe of an aircraft aft fuselage is produced. However, in other embodiments, a different type of structure is produced, for example a structure that, in use, is to be attached to a different structure may be produced. For example, an airframe of a different part of the aircraft, e.g. the fore fuselage, may be produced. In such embodiments, the jig may comprise a different type of reference frame representing a different type of entity to which the structure being assembled is to be attached.

In the above embodiments, the aircraft comprises three frames, three longerons, two beams, and a plurality of keels. However, in other embodiments, the airframe comprises a different number of frames, longerons, beams, and/or keels. In some embodiments, one or more of the listed types of airframe components may be omitted. In some embodiments, the airframe comprises a different type of airframe component instead of or in addition to those listed above.

In the above embodiments, a frame comprises four attachment features which are used to determine the frame datum. The frame attachment features are holes through the structure of the frame. Also, the jig comprises jig pickups configured to attach to the frame attachment features. Also, the frame machining fixture comprises locator pins configured to couple to the frame attachment features. However, in other embodiments, one or more of the frames or other airframe components comprises a different number of attachment features. In some embodiments, one or more of the attachment features may be a different type of attachment feature other than a through hole. Also, the jig may comprise a different type of pickup that is configured to attach to the different type of attachment feature. For example, in some embodiments, an attachment feature may be a block-like structure and a jig pickup may comprise a clamp for clamping to the block-like structure. Also, the frame machining fixture may comprise a different type of device that is configured to attach to the different type of attachment feature.

In the above embodiments, longeron landings are machined with respect to a local frame datum. However, in other embodiments one or more different types of frame features are formed with respect to the frame datum instead of or in addition to one or more of the longeron landings.

In the above embodiments, the airframe components are made of aluminium. However, in other embodiments, one or more of the airframe components is made of a different type of material.

In the above embodiments, the jig frame is a steel beam frame in the shape of a rectangular parallelepiped. However, in other embodiments, the jig frame is made of a different material and/or is a different shape.

In the above embodiments, the frame machining fixture comprises three blocks which are used as reference points or surfaces from which a CNC cutting tool is moved. The blocks are located on an upper surface of the frame machining fixture. In other embodiments, the frame machining fixture comprises a different number of blocks or other devices that provide the above described functionality. In some embodiments, one or more of the blocks is located on a different part of the frame machining fixture, e.g. on a side of the base portion.

The invention claimed is:

1. An assembly process for assembling at least part of an aircraft airframe, the assembly process comprising:

providing a first assembly, the first assembly including a first part of the aircraft airframe and a first reference structure attached to the first part of the aircraft airframe, the first part of the aircraft airframe having a predetermined position and orientation with respect to the first reference structure, the first reference structure comprising a first plurality of key protrusions;

providing a second assembly, the second assembly including a second part of the aircraft airframe and a second reference structure attached to the second part of the aircraft airframe, the second part of the aircraft airframe having a predetermined position and orientation with respect to the second reference structure, the second reference structure comprising a second plurality of key protrusions;

locating each of the first plurality of key protrusions in a respective key hole of a first receptacle attaching the first reference structure to the first receptacle;

locating each of the second plurality of key protrusions in a respective key hole of a second receptacle, attaching the second reference structure to the second receptacle;

moving, by an actuation device, the first and second receptacles into a predetermined configuration for the receptacles, thereby moving the first part of the aircraft airframe and the second part of the aircraft airframe into a predetermined configuration for the airframe parts;

while the first part of the aircraft airframe and the second part of the aircraft airframe are in the predetermined configuration for the airframe parts, performing an assembly operation on the airframe parts to fixedly attach together the first part of the aircraft airframe and the second part of the aircraft airframe, producing the at least part of an aircraft airframe; and wherein:
  each key protrusion comprises a fastener head at a distal end of that key protrusion and a shank portion connecting the fastener head of that key protrusion to the reference frame, the fastener heads having a first diameter, the shank portions having a second diameter, the second diameter being less than the first diameter; and
  each key hole comprises a first portion having a having a diameter greater than or equal to the first diameter, and a second portion having a diameter greater than or equal to the second diameter and less than the first diameter.

2. The method according to claim 1, wherein the at least part of an aircraft airframe is an aircraft aft fuselage, the first part of the aircraft airframe being a first side portion of the aircraft aft fuselage, and the second part of the aircraft airframe being a second side portion of the aircraft aft fuselage.

3. The method according to claim 1, wherein the at least part of an aircraft airframe is for attachment to a further part of the aircraft airframe, and providing the first assembly comprises:
  providing a plurality of components of the first part of the aircraft airframe;
  for each component of the first part of the aircraft airframe, determining a position and orientation of that component relative to the further part of the aircraft airframe that that component would have if the at least part of the aircraft airframe was attached to the further part of the aircraft airframe;
  providing the first reference structure, the first reference structure being representative of the further part of the aircraft airframe;
  arranging the components of the first part of an aircraft airframe such that the position and orientation of each of said components relative to the first reference structure is the same as the determined position and orientation relative to the further part of the aircraft airframe that that component would have if the at least part of the aircraft airframe was attached to the further part of the aircraft airframe; and
  thereafter, attaching together the components of the first part of the aircraft airframe such that the relative positions and orientations of those components are maintained.

4. The method according to claim 3, wherein the step of attaching together the components of the first part of the aircraft airframe is performed such that the relative position and orientation of each of the components of the first part of the aircraft airframe and the first reference structure is maintained.

5. The method according to claim 3, wherein the further part of the aircraft airframe is at least part of an aircraft fore fuselage.

6. The method according to claim 3, wherein each component of the first part of the aircraft airframe is selected from a group of airframe components consisting of frames, longerons, keels, and beams.

7. The method according to claim 3, wherein:
  the step of arranging the components of the first part of an aircraft airframe comprises producing an assembly tool, the assembly tool including the first reference structure, and mounting the components of the first part of an aircraft airframe on the assembly tool; and
  after the components of the first part of the aircraft airframe have been attached together, the first part of the aircraft airframe and first reference structure attached thereto are removed from the assembly tool, thereby providing the first assembly.

8. The method according to claim 7, wherein the step of producing the assembly tool comprises:
  for each component of the first part of the aircraft airframe, using the determined position and orientation of that component relative to the further part of the aircraft airframe, determining one or more positions and orientations relative to the further part of the aircraft airframe at which that component is to be supported;
  providing a jig frame;
  attaching, to the jig frame, the first reference structure;
  providing a plurality of pickup devices, each pickup device having a receiving element for receiving a component; and
  securing each pickup device to the jig frame such that a position and orientation relative to the first reference structure of each receiving element is the same as a respective determined position and orientation relative to the further part of the aircraft airframe at which a component is to be supported.

9. The method according to claim 3, wherein providing the second assembly comprises:
  providing a plurality of components of the second part of the aircraft airframe;
  for each component of the second part of the aircraft airframe, determining a position and orientation of that component relative to the further part of the aircraft airframe that that component would have if the at least part of the aircraft airframe was attached to the further part of the aircraft airframe;

providing the second reference structure, the second reference structure being representative of the further part of the aircraft airframe;

arranging the components of the second part of an aircraft airframe such that the position and orientation of each of said components relative to the second reference structure is the same as the determined position and orientation relative to the further part of the aircraft airframe that that component would have if the at least part of the aircraft airframe was attached to the further part of the aircraft airframe; and thereafter, attaching together the components of the second part of the aircraft airframe such that the relative positions and orientations of those components are maintained.

10. The method according to claim 9 wherein the step of attaching together the components of the second part of the aircraft airframe is performed such that the relative position and orientation of each of the components of the second part of the aircraft airframe and the second reference structure is maintained.

11. At least part of an aircraft airframe having been produced using the method according to claim 1.

12. At least part of an aircraft airframe according to claim 11, wherein the at least part of the aircraft airframe is an aircraft aft fuselage.

13. Apparatus for assembling at least part of an aircraft airframe, the apparatus comprising:

a first receptacle comprising a first plurality of key holes, each of the first plurality of key holes configured to receive a respective key protrusion of a first reference structure of a first assembly, the first assembly including a first part of the aircraft airframe and the first reference structure attached to the first part of the aircraft airframe, the first part of the aircraft airframe having a predetermined position and orientation with respect to the first reference frame;

a second receptacle comprising a second plurality of key holes, each of the second plurality of key holes configured to receive a respective key protrusion of a second reference structure of a second assembly, the second assembly including a second part of the aircraft airframe and the second reference structure attached to the second part of the aircraft airframe, the second part of the aircraft airframe having a predetermined position and orientation with respect to the second reference frame;

an actuation device operatively coupled to the first and second receptacles and configured to move the first and second receptacles into a predetermined configuration for the receptacles, moving the first part of the aircraft airframe and the second part of the aircraft airframe into a predetermined configuration for the airframe parts; and wherein:

each key protrusion comprises a fastener head at a distal end of that key protrusion and a shank portion connecting the fastener head of that key protrusion to the reference frame, the fastener heads having a first diameter, the shank portions having a second diameter, the second diameter being less than the first diameter; and each key hole comprises a first portion having a having a diameter greater than or equal to the first diameter, and a second portion having a diameter greater than or equal to the second diameter and less than the first diameter.

14. The apparatus according to claim 13, wherein the at least part of an aircraft airframe is an aircraft aft fuselage, the first part of the aircraft airframe being a first side portion of the aircraft aft fuselage, and the second part of the aircraft airframe being a second side portion of the aircraft aft fuselage.

* * * * *